(12) United States Patent
Ramasubramonian et al.

(10) Patent No.: US 12,430,809 B2
(45) Date of Patent: Sep. 30, 2025

(54) PREDICTIVE GEOMETRY CODING OF POINT CLOUD

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 18/486,541

(22) Filed: Oct. 13, 2023

(65) Prior Publication Data

US 2024/0144543 A1 May 2, 2024

Related U.S. Application Data

(60) Provisional application No. 63/379,847, filed on Oct. 17, 2022.

(51) Int. Cl.
*G06T 9/40* (2006.01)
*G06T 9/00* (2006.01)

(52) U.S. Cl.
CPC ............... *G06T 9/40* (2013.01); *G06T 9/00* (2013.01); *G06T 9/001* (2013.01); *G06T 9/004* (2013.01)

(58) Field of Classification Search
CPC ............ G06T 9/40; G06T 9/00; G06T 9/004; G06T 15/10; G06T 15/80; G06T 17/005;
(Continued)

(56) References Cited

U.S. PATENT DOCUMENTS 11,875,541 B2 * 1/2024 Ray .................. G01S 7/4808
11,902,348 B2 * 2/2024 Hur .................. H04L 65/762
(Continued)

FOREIGN PATENT DOCUMENTS

WO    2021084292 A1    5/2021
WO    2021141090 A1    7/2021

OTHER PUBLICATIONS

Flynn D (Apple Inc)., et al., "G-PCC EE13.8 Report on Low-latency Coding for Automotive/mapping Applications", 130, MPEG Meeting, Apr. 20, 2020-Apr. 24, 2020, Alpbach, (Motion Picture Expert Group or ISO/IEC JTC1/SC29/WG11), No. m53391, Apr. 11, 2020, pp. 1-8, XP030286856, p. 1-p. 3.

(Continued)

*Primary Examiner* — Vijay Shankar
(74) *Attorney, Agent, or Firm* — QUALCOMM Incorporated; Espartaco Diaz Hidalgo

(57) ABSTRACT

An example device includes memory configured to store the point cloud data and one or more processors configured to determine a first point of the point cloud data to be a first node of a first prediction tree branch. The one or more processors are configured to determine that a first azimuth difference between the first point and a second point of the point cloud data does not meet a first azimuth threshold, and based on that determination, determine the second point to be a second node of the first prediction tree branch. The one or more processors are configured to determine that a second azimuth difference between a third point of the point cloud data and a fourth point of the point cloud data meets the first azimuth threshold and based on that determination, determine the fourth point to be a first node of a second prediction tree branch.

30 Claims, 13 Drawing Sheets

(58) Field of Classification Search
CPC ....... G06T 17/10; G06T 9/001; H04N 19/597; H04N 19/96
See application file for complete search history.

(56) References Cited

U.S. PATENT DOCUMENTS

| | | | |
|---|---|---|---|
| 11,935,270 B2* | 3/2024 | Ray | G01S 17/931 |
| 2021/0400103 A1 | 12/2021 | Hur et al. | |
| 2022/0108491 A1 | 4/2022 | Ray et al. | |
| 2022/0343556 A1 | 10/2022 | Iguchi et al. | |
| 2022/0398784 A1* | 12/2022 | Taquet | G06T 9/40 |

OTHER PUBLICATIONS

Flynn D., et al., (Apple Inc) "[G-PCC][New proposal] Predictive Geometry Coding", 128, MPEG Meeting, Oct. 7, 2019-Oct. 11, 2019, Geneva, (Motion Picture Expert Group or ISO/IEC JTC1/SC29/WG11), No. m51012, Oct. 6, 2019, 10 Pages, XP030221520, Paragraphs 1-1.3.

"G-PCC 2nd Edition Codec Description", 138, MPEG Meeting, Apr. 25, 2022-Apr. 29, 2022, Online, (Motion Picture Expert Group or ISO/IEC JTC1/SC29/WG11), No. n21558, Jun. 21, 2022, 59 Pages, XP030302661, Paragraphs 3 and 6.

Hur H (LG Electronic Inc)., et al., "[G-PCC][CE13.38 related] Modification on the Azimuthal Sorting for Predictive Geometry Tree Coder", 131, MPEG Meeting, Jun. 29, 2020-Jul. 3, 2020, Online, (Motion Picture Expert Group or ISO/IEC JTC1/SC29/WG11), No. m54592, Jun. 24, 2020, 5 Pages, XP030289076, Paragraphs 1-3 with Figures 1 and 2.

International Search Report and Written Opinion—PCT/US2023/076945—ISA/EPO—Mar. 4, 2024.

Taquet J (Xiaomi)., et al., "[G-PCC][EE13.51] Report on Predictive Geometry Improvement", 135, MPEG Meeting, Jul. 12, 2021-Jul. 16, 2021, Online, (Motion Picture Expert Group or ISO/IEC JTC1/SC29/WG11), No. m57092, Jun. 30, 2021, 13 Pages, XP030296608, The Whole Document.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Royo S., et al., "An Overview of Lidar Imaging Systems for Autonomous Vehicles", Applied Sciences, vol. 9, No. 19, 4093, Published: Sep. 30, 2019, pp. 1-37.

* cited by examiner

⊝ Root vertex

◯ Branch vertex with 1 child

⊕ Branch vertex with 2 children

⦸ Branch vertex with 3 children

⊕ Leaf vertex

PREDICTIVE GEOMETRY CODING OF POINT CLOUD

This application claims the benefit of U.S. Provisional Patent Application 63/379,847, filed Oct. 17, 2022, the entire content of which is hereby incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for predictive geometry coding of point cloud data, and in particular, to the generation of prediction trees for predictive geometry coding.

A LIDAR system may contain one or more laser sources and detectors/sensors, and each sensor may capture points (e.g., of a point cloud) in a pre-determined order. When points are coded using point cloud compression codecs, points belonging to different lasers/sensors are typically coded together. When the point cloud is coded using predictive geometry, a prediction tree may be generated. Suboptimal construction of the tree may result in coding inefficiencies. Therefore, it is desirable to generate the tree such that predictive geometry coding can take advantage of the inherent dependencies between the various points of the sensor.

In one example, this disclosure describes a device for coding point cloud data, the device comprising: one or more memories configured to store the point cloud data; and one or more processors implemented in circuitry and communicatively coupled to the one or more memories, the one or more processors being configured to: determine a first point of the point cloud data to be a first node of a first prediction tree branch of a prediction tree; determine that a first azimuth difference between the first point and a second point of the point cloud data does not meet a first azimuth threshold, wherein the first point and the second point comprise successive points in an order; based on the first azimuth difference not meeting the first azimuth threshold, determine the second point to be a second node of the first prediction tree branch; determine that a second azimuth difference between a third point of the point cloud data and a fourth point of the point cloud data meets the first azimuth threshold, wherein the third point and the fourth point comprise successive points in the order and wherein the third point comprises a third node of the first prediction tree branch; based on the second azimuth difference meeting the first azimuth threshold, terminate the first prediction tree branch at the third point such that the third point comprises a leaf node of the first prediction tree branch and determine the fourth point to be a first node of a second prediction tree branch; connect the first prediction tree branch and the second prediction tree branch in the prediction tree; and code the point cloud data based on the prediction tree.

In another example, this disclosure describes a method of coding point cloud data, the method comprising: determining a first point of the point cloud data to be a first node of a first prediction tree branch of a prediction tree; determining that a first azimuth difference between the first point and a second point of the point cloud data does not meet a first azimuth threshold, wherein the first point and the second point comprise successive points in an order; based on the first azimuth difference not meeting the first azimuth threshold, determining the second point to be a second node of the first prediction tree branch; determining that a second azimuth difference between a third point of the point cloud data and a fourth point of the point cloud data meets the first azimuth threshold, wherein the third point and the fourth point comprise successive points in the order and wherein the third point comprises a third node of the first prediction tree branch; based on the second azimuth difference meeting the first azimuth threshold, terminating the first prediction tree branch at the third point such that the third point comprises a leaf node of the first prediction tree branch and determine the fourth point to be a first node of a second prediction tree branch; connecting the first prediction tree branch and the second prediction tree branch in the prediction tree; and coding the point cloud data based on the prediction tree.

In another example, this disclosure describes a device for coding point cloud data, the device comprising: means for determining a first point of the point cloud data to be a first node of a first prediction tree branch of a prediction tree; means for determining that a first azimuth difference between the first point and a second point of the point cloud data does not meet a first azimuth threshold, wherein the first point and the second point comprise successive points in an order; means for determining, based on the first azimuth difference not meeting the first azimuth threshold, the second point to be a second node of the first prediction tree branch; means for determining that a second azimuth difference between a third point of the point cloud data and a fourth point of the point cloud data meets the first azimuth threshold, wherein the third point and the fourth point comprise successive points in the order and wherein the third point comprises a third node of the first prediction tree branch; means for terminating, based on the second azimuth difference meeting the first azimuth threshold, the first prediction tree branch at the third point such that the third point comprises a leaf node of the first prediction tree branch and determine the fourth point to be a first node of a second prediction tree branch; means for connecting the first prediction tree branch and the second prediction tree branch in the prediction tree; and means for coding the point cloud data based on the prediction tree.

In yet another example, this disclosure describes a non-transitory, computer-readable storage media storing instructions, which, when executed, cause one or more processors to: determine a first point of the point cloud data to be a first node of a first prediction tree branch of a prediction tree; determine that a first azimuth difference between the first point and a second point of the point cloud data does not meet a first azimuth threshold, wherein the first point and the second point comprise successive points in an order; based on the first azimuth difference not meeting the first azimuth threshold, determine the second point to be a second node of the first prediction tree branch; determine that a second azimuth difference between a third point of the point cloud data and a fourth point of the point cloud data meets the first azimuth threshold, wherein the third point and the fourth point comprise successive points in the order and wherein the third point comprises a third node of the first prediction tree branch; based on the second azimuth difference meeting the first azimuth threshold, terminate the first prediction tree branch at the third point such that the third point comprises a leaf node of the first prediction tree branch and determine the fourth point to be a first node of a second prediction tree branch; connect the first prediction tree branch and the second prediction tree branch in the prediction tree; and code the point cloud data based on the prediction tree.

The details of one or more examples are set forth in the accompanying drawings and the description below. Other features, objects, and advantages will be apparent from the description, drawings, and claims.

DETAILED DESCRIPTION

Not all LIDAR systems rotate a full 360 degrees. For example, some LIDAR systems may sweep through a more restricted range (e.g., 120 degrees) and then return to a starting angle to perform a next sweep. As such, consecutive points, e.g., in a scanning or capture order, may at times, be in very different locations and one point may not provide for an accurate prediction of the next successive point.

When a point cloud is coded using predictive geometry, a prediction tree may be generated. Sub-optimal construction of the prediction tree may result in coding inefficiencies. Therefore, it may be desirable to generate the prediction tree such that predictive geometry coding can take advantage of the inherent dependencies between the various points sensed by the LIDAR system and avoid using a point of an end of a sweep to predict a point at the beginning of a next sweep, such as when the LIDAR system does not rotate a full 360 degrees.

Figure 1:
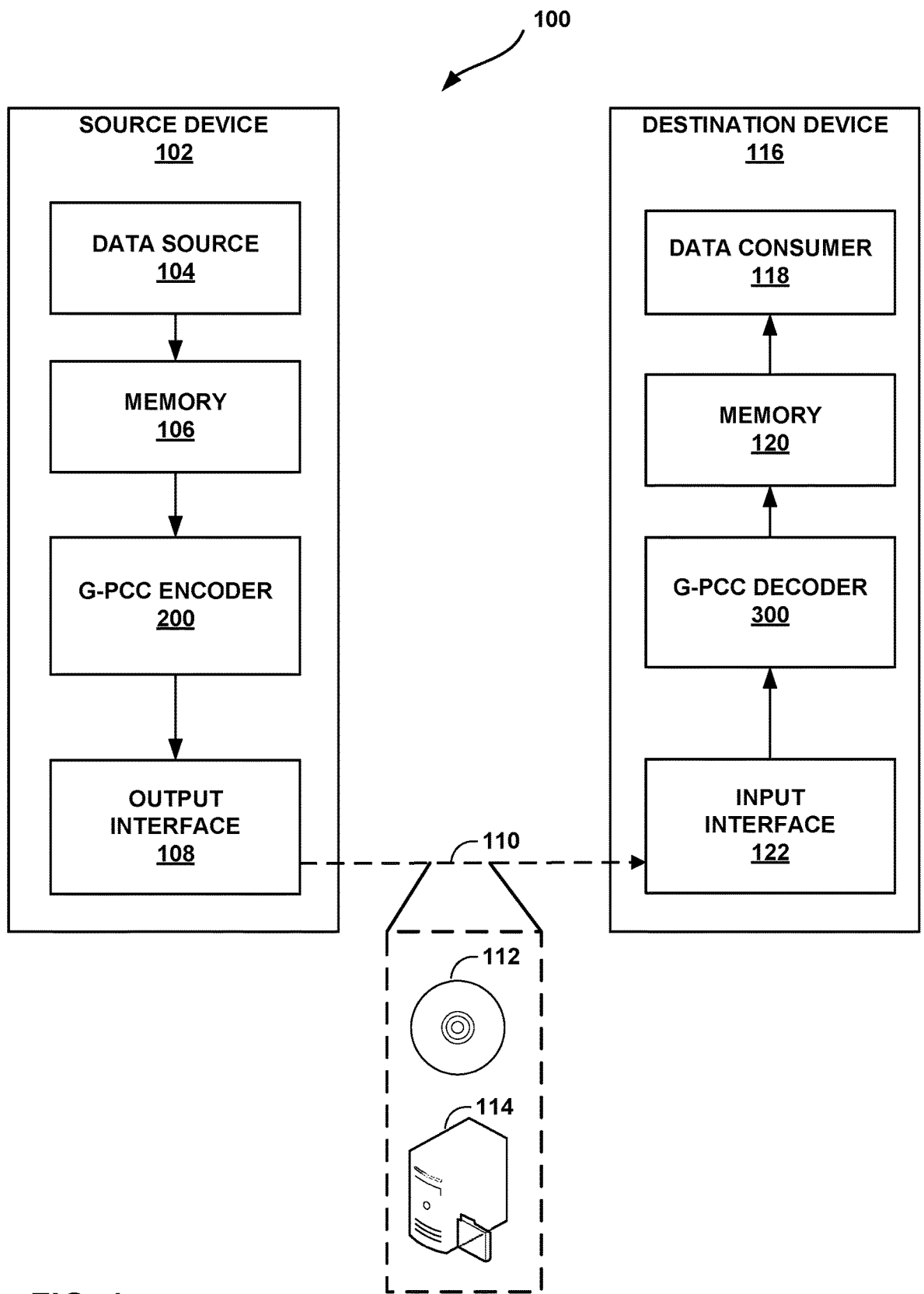
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, one or more memories 106, a G-PCC encoder 200, and an output interface 108. Destination device 116 includes an input interface 122, a G-PCC decoder 300, one or more memories 120, and a data consumer 118. In accordance with this disclosure, G-PCC encoder 200 of source device 102 and G-PCC decoder 300 of destination device 116 may be configured to apply the techniques of this disclosure related to generation of prediction trees for predictive geometry coding. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to generation of prediction trees for predictive geometry coding. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively, or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent one or more general purpose memories. In some examples, memory 106 and memory 120 may store raw data, e.g., raw data from data source 104 and raw, decoded data from G-PCC decoder 300. Additionally, or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent one or more of any type of media or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both, that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, and/or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in suitable, non-transitory computer-readable media and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) and more recently ISO/IEC MPEG 3DG (JTC 1/SC29/WG 7) is studying the potential need for standardization of point cloud coding technology with a compression capability that significantly exceeds that of the current approaches and will target to create the standard. MPEG is working on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in ISO/IEC FDIS 23090-9 Geometry-based Point Cloud Compression, ISO/IEC JTC1/SC29/WG7 m55637, Teleconference, October 2020 and a description of the G-PCC codec is available in G-PCC Codec Description, ISO/IEC JTC 1/SC29/WG 7 MDS20983, Teleconference, October 2021 (hereinafter "G-PCC Codec Description).

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
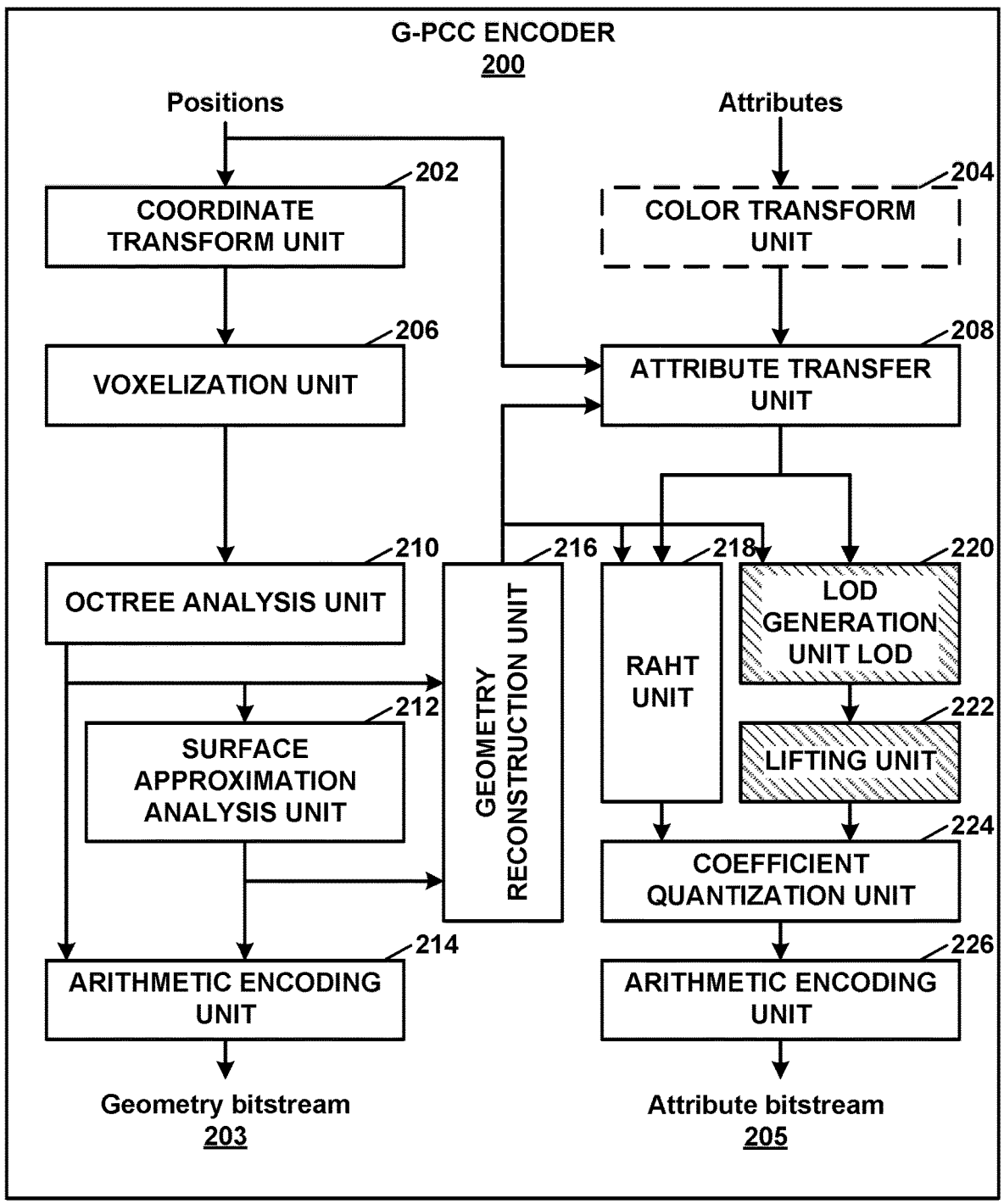
FIG. 2 is a block diagram illustrating an example Geometry Point Cloud Compression (G-PCC) encoder.
Figure 3:
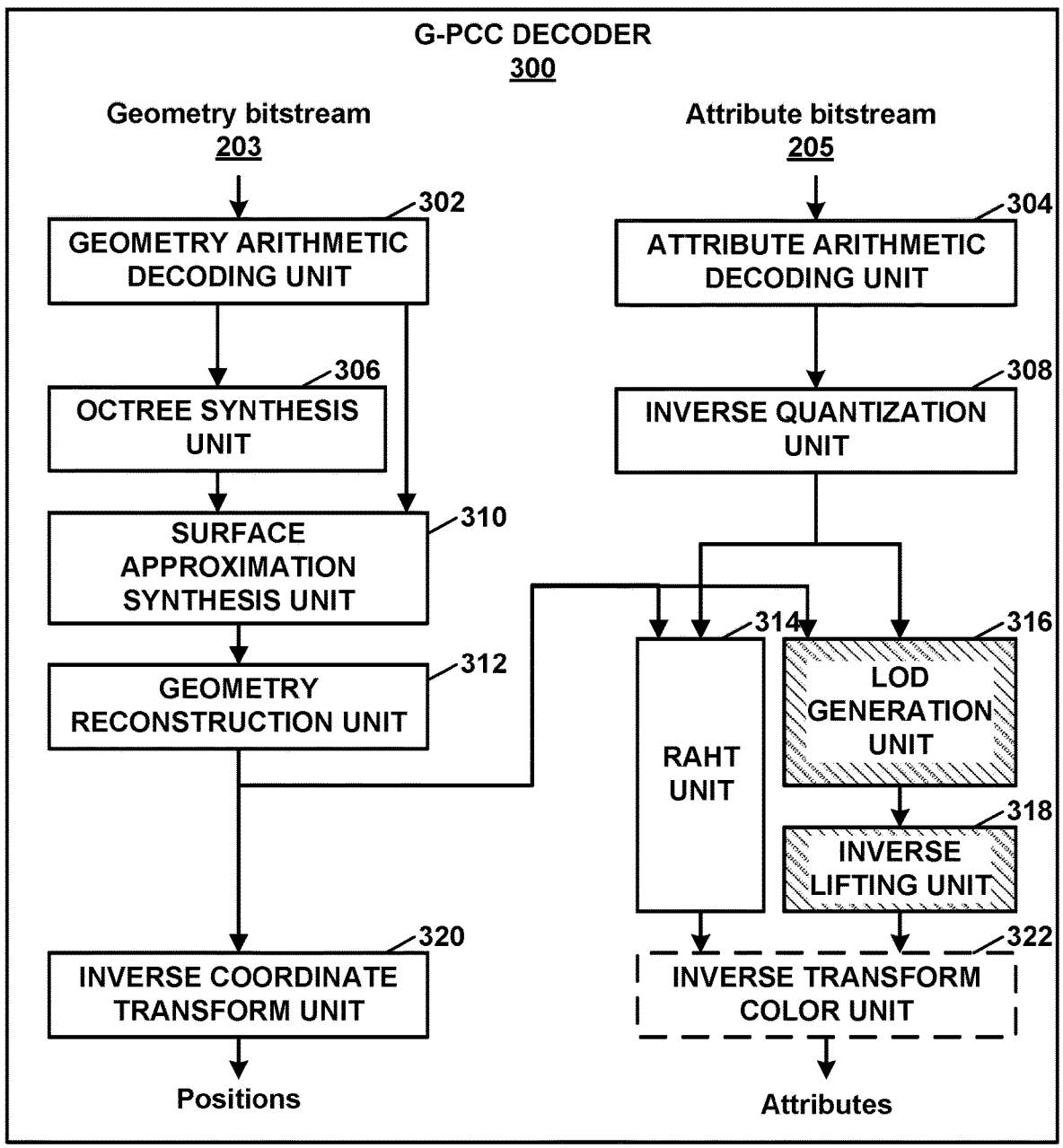
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 surface approximation analysis unit 212 and RAHT unit 218, and FIG. 3, surface approximation analysis unit 310 and RAHT unit 314 are options typically used for Category 1 data. Diagonal-crosshatched modules are options typically used for Category 3 data. All the other modules are common between Categories 1 and 3. See ISO/IEC FDIS 23090-9 Geometry-based Point Cloud Compression, ISO/IEC JTC1/SC29/WG7 m55637, Teleconference, October 2020.

For geometry coding, two different types of coding techniques exist: Octree and predictive-tree coding. Octree coding is now discussed. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Figure 4:
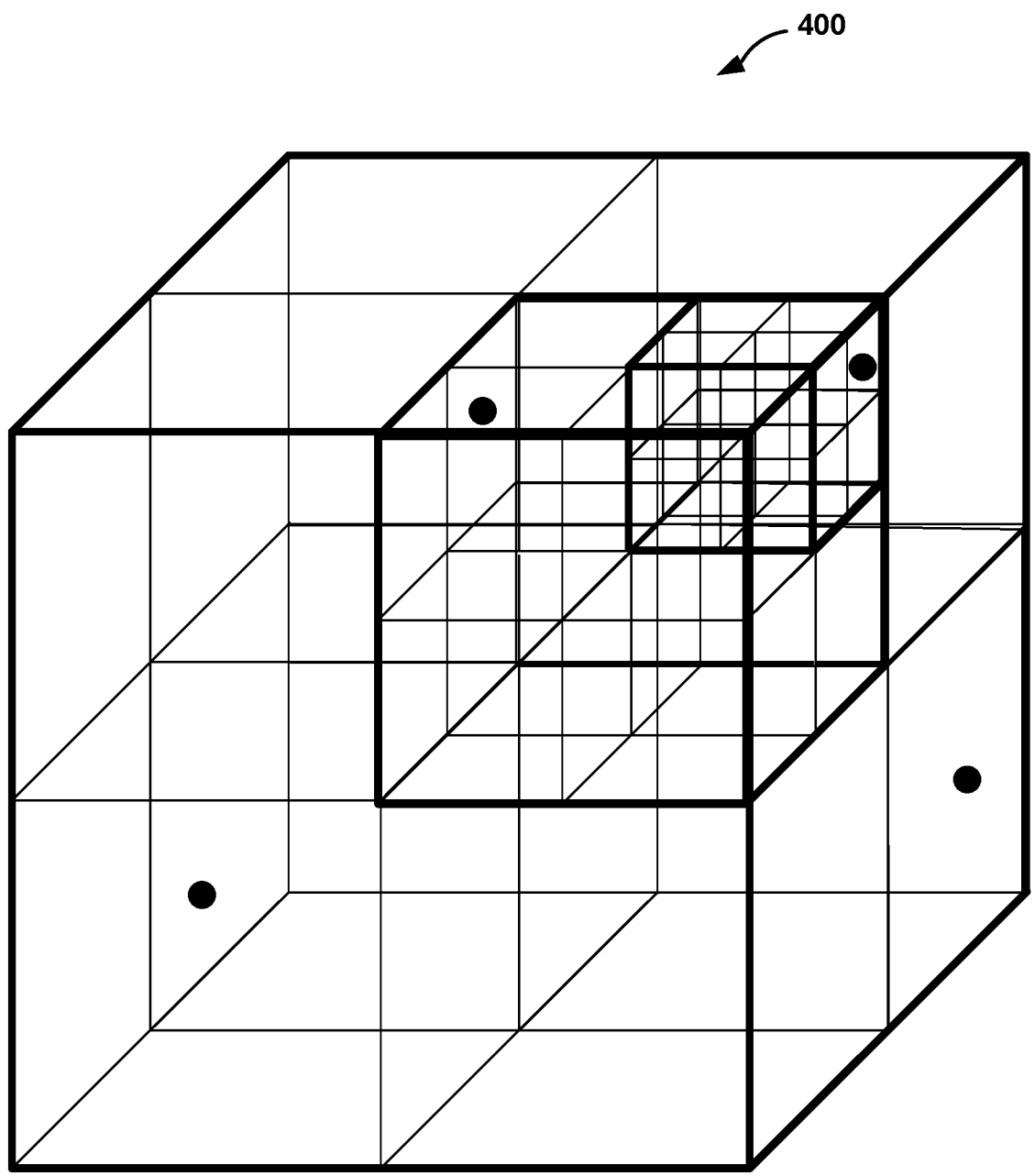
FIG. 4 is a conceptual diagram illustrating an example octree split for geometry coding.

FIG. 4 is a conceptual diagram illustrating an example octree split for geometry coding. At each node of octree 400, G-PCC encoder 200 may signal an occupancy to G-PCC decoder 300 (when the occupancy is not inferred by G-PCC decoder 300) for one or more of a node's child nodes (e.g., up to eight nodes). Multiple neighborhoods are specified including (a) nodes that share a face with a current octree node, (b) nodes that share a face, edge or a vertex with the current octree node, etc. Within each neighborhood, the occupancy of a node and/or the node's children may be used to predict the occupancy of the current node or the node's children. For points that are sparsely populated in certain nodes of the octree, the codec also supports a direct coding mode where the 3D position of the point is encoded directly. G-PCC encoder 200 may signal a flag to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points.

Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively, or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LOD s, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse transform color unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 5:
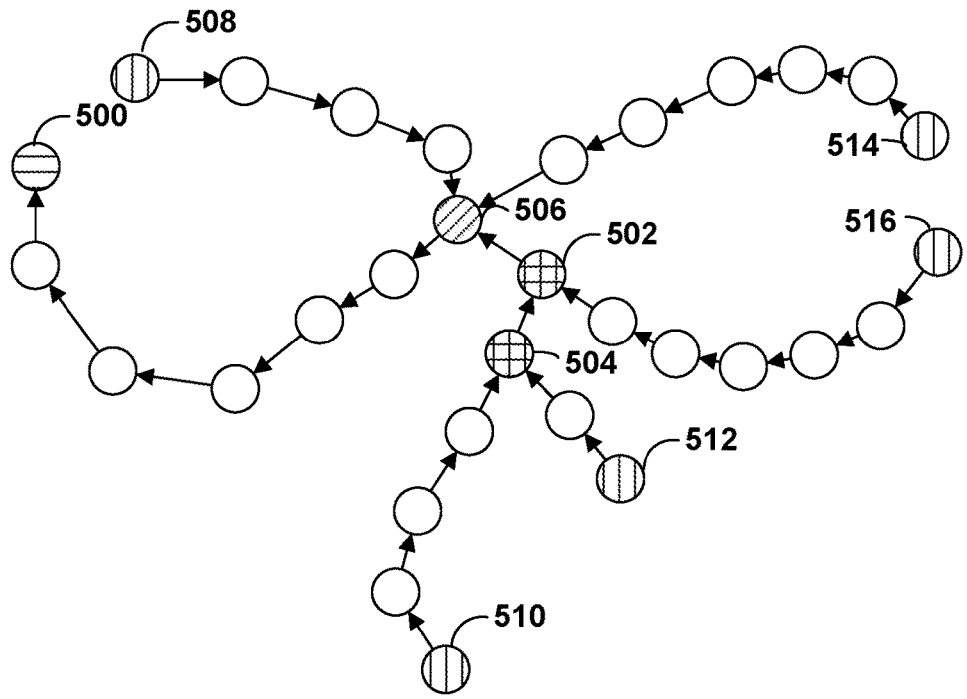
FIG. 5 is a conceptual diagram illustrating an example of a prediction tree.

Predictive geometry coding (see, e.g., G-PCC Codec Description) was introduced as an alternative to the octree geometry coding, where the nodes are arranged in a tree structure (which defines the prediction structure), and various prediction strategies are used to predict the coordinates of each node in the tree with respect to its predictors. FIG. 5 shows an example of a prediction tree, a directed graph where the arrow point to the prediction direction. The horizontal-hashed node is the root vertex and has no predictors; the crosshatched nodes have two children; the diagonal-hashed node has 3 children; the non-hashed nodes have one child and the vertical-hashed nodes are leaf nodes and these have no children. Every node, aside from the root node, has only one parent node.

FIG. 5 is a conceptual diagram illustrating an example of a prediction tree. Node 500 is the root vertex and has no predictors. Nodes 502 and 504 have two children. Node 506 has 3 children. Nodes 508, 510, 512, 514, and 516 are leaf nodes and these have no children. The remaining nodes each have one child. Every node aside from root node 500 has only one parent node.

Four prediction strategies are specified for each node based on its parent (p0), grand-parent (p1) and great-grand-parent (p2):
No prediction/zero prediction (0)
Delta prediction (p0)
Linear prediction (2*p0−p1)
Parallelogram prediction (2*p0+p1−p2)

G-PCC encoder 200 may employ any algorithm to generate the prediction tree; the algorithm used may be determined based on the application/use case and several strategies may be used. Some strategies are described in the G-PCC Codec Description.

For each node, the residual coordinate values are coded in the bitstream starting from the root node in a depth-first manner. For example, G-PCC encoder 200 may code the residual coordinate values in the bitstream.

Predictive geometry coding is useful mainly for Category 3 (LIDAR-acquired) point cloud data, e.g., for low-latency applications.

Figure 6A:
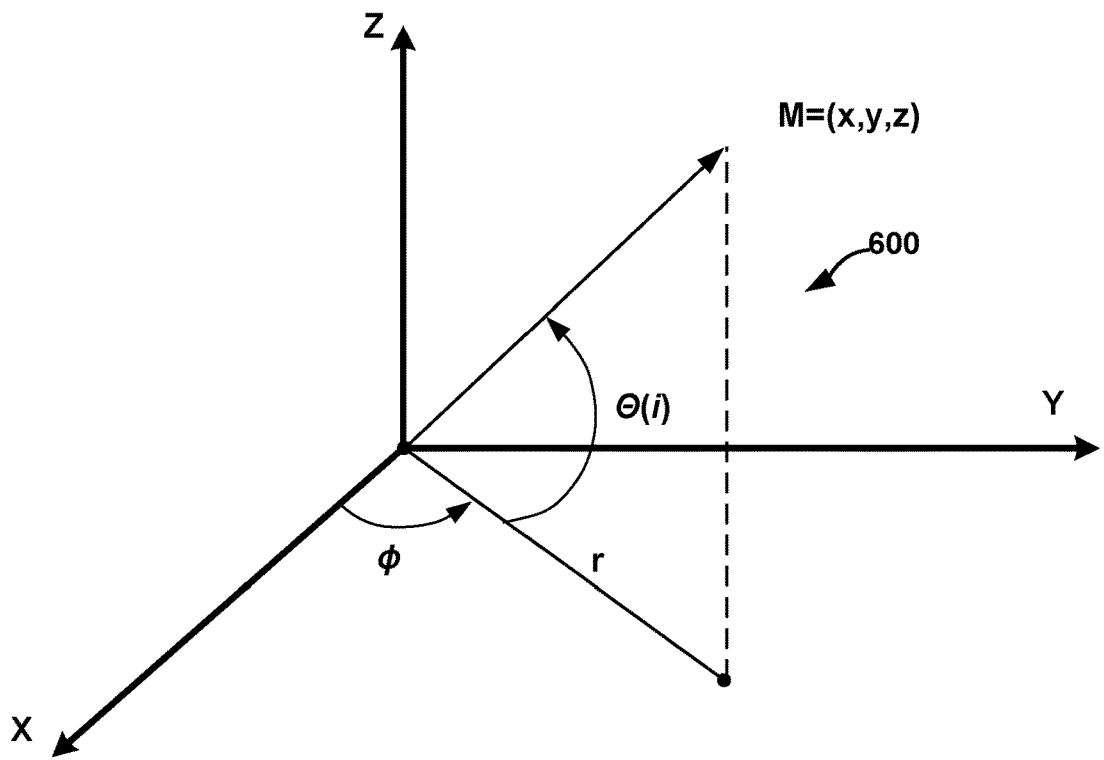
FIGS. 6A and 6B are conceptual diagrams illustrating an example of a spinning Light Detection and Ranging (LIDAR) acquisition model.
Figure 6B:
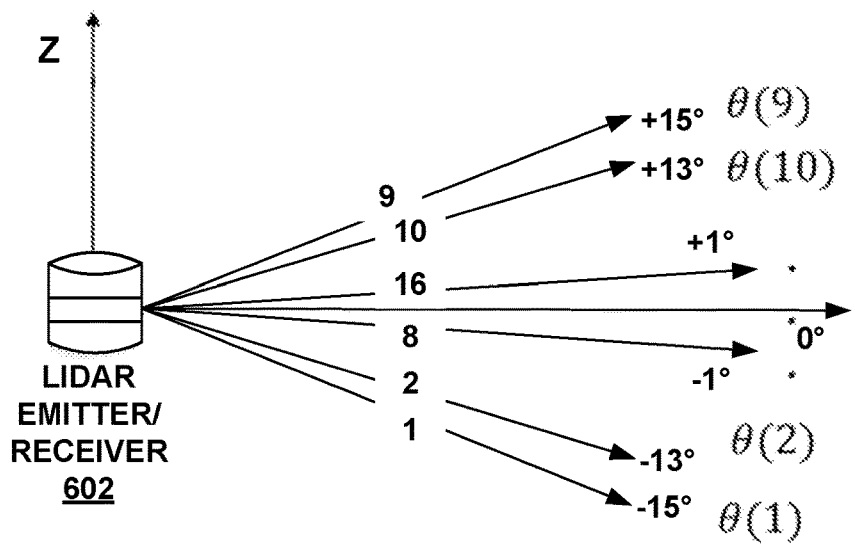

FIGS. 6A and 6B are conceptual diagrams illustrating an example of a spinning LIDAR acquisition model. Angular mode for predictive geometry coding is now described. Angular mode may be used in predictive geometry coding, where the characteristics of LIDAR sensors may be utilized in coding the prediction tree more efficiently. The coordinates of the positions are converted to the (r, $\phi$, i) (radius, azimuth and laser index) domain 600 and a prediction is performed in this domain 600 (e.g., the residuals are coded in r, $\phi$, i domain). Due to the errors in rounding, coding in r, $\phi$, i is not lossless and hence a second set of residuals may be coded which correspond to the Cartesian coordinates. A description of the encoding and decoding strategies used for angular mode for predictive geometry coding is reproduced below from the G-PCC Codec Description.

The technique focuses on point clouds acquired using a spinning LIDAR model. Here, LIDAR 602 has N lasers (e.g., N=16, 32, 64) spinning around the Z axis according to an azimuth angle $\phi$. Each laser may have different elevation $\theta(i)_{i=1\ldots N}$ and height $\varsigma(i)_{i=1\ldots N}$. Suppose that the laser i hits a point M, with cartesian integer coordinates (x, y, z), defined according to the coordinate system shown in FIGS. 6A-6B.

This technique models the position of M with three parameters (r, $\phi$, i), which are computed as follows:

$$r = \sqrt{x^2 + y^2}$$

$$\phi = \operatorname{atan2}(y, x)$$

$$i = \arg \min_{j=1\ldots N} \{z + \varsigma(j) - r \times \tan(\theta(j))\},$$

More precisely, the technique uses the quantized version of (r, $\phi$, i), denoted ($\tilde{r}$, $\tilde{\phi}$, i), where the three integers $\tilde{r}$, $\tilde{\phi}$ and i are computed as follows:

$$\tilde{r} = \operatorname{floor}\left(\frac{\sqrt{x^2 + y^2}}{q_r} + o_r\right) = \operatorname{hypot}(x, y)$$

$$\tilde{\phi} = \operatorname{sign}(\operatorname{atan2}(y, x)) \times \operatorname{floor}\left(\frac{|\operatorname{atan2}(y, x)|}{q_\phi} + o_\phi\right)$$

$$i = \arg \min_{j=1\ldots N} \{z + \varsigma(j) - r \times \tan(\theta(j))\}$$

where ($q_r$, $o_r$) and ($q_\phi$, $o_\phi$) are quantization parameters controlling the precision of $\tilde{\phi}$ and $\tilde{r}$, respectively. sign(t) is a function that returns 1 if t is positive and (−1) otherwise. |t| is the absolute value of t.

To avoid reconstruction mismatches due to the use of floating-point operations, the values of $\varsigma(i)_{i=1\ldots N}$ and $\tan(\theta(i))_{i=1\ldots N}$ are pre-computed and quantized as follows:

$$\tilde{z}(i) = \text{sign}(\zeta(i)) \times \text{floor}\left(\frac{|\zeta(i)|}{q_\zeta} + o_\zeta\right)$$

$$\tilde{t}(i) = \text{sign}(\zeta(\tan(\theta(j)))) \times c\left(\frac{|\tan(\theta(j))|}{q_\theta} + o_\theta\right)$$

where $(q_\zeta, o_\zeta)$ and $(q_\theta, o_\theta)$ are quantization parameters controlling the precision of $\tilde{\zeta}$ and $\tilde{\theta}$, respectively.

The reconstructed cartesian coordinates are obtained as follows:

$$\hat{x} = \text{round}(\tilde{r} \times q_r \times \text{app\_cos}(\tilde{\phi} \times q_\phi))$$

$$\hat{y} = \text{round}(\tilde{r} \times q_r \times \text{app\_sin}(\tilde{\phi} \times q_\phi))$$

$$\hat{z} = \text{round}(\tilde{r} \times q_r \times \tilde{t}(i) \times q_\theta - \tilde{z}(i) \times q_\zeta),$$

where app_cos(.) and app_sin(.) are approximations of cos (.) and sin(.). The calculations could be performed using a fixed-point representation, a look-up table, and/or linear interpolation.

Note that $(\hat{x}, \hat{y}, \hat{z})$ may be different from $(x, y, z)$ due to various reasons, such as quantization, approximations, model imprecision, model parameters imprecisions, or the like.

Let $(r_x, r_y, r_z)$ be the reconstruction residuals defined as follows:

$$r_x = x - \hat{x}$$

$$r_y = y - \hat{y}$$

$$r_z = z - \hat{z}$$

With this technique, G-PCC encoder 200 may proceed as follows:

1) Encode the model parameters $\tilde{t}(i)$ and $\tilde{z}(i)$ and the quantization parameters $q_r, q_\zeta, q_\theta$ and $q_\theta$
2) Apply the geometry predictive scheme described in the text of ISO/IEC FDIS 23090-9 Geometry-based Point Cloud Compression, ISO/IEC JTC 1/SC29/WG 7 m55637, Teleconference, October 2020.
3) to the representation $(\tilde{r}, \tilde{\phi}, i)$
   A new predictor leveraging the characteristics of LIDAR may be introduced. For instance, the rotation speed of the LIDAR scanner around the z-axis is usually constant. Therefore, we could predict the current $\tilde{\phi}(j)$ as follows:

$$\tilde{\phi}(j) = \tilde{\phi}(j-1) + n(j) \times \delta_\phi(k)$$

Where
   $(\delta_\phi(k))_{k=1 \ldots K}$ is a set of potential speeds G-PCC encoder 200 may use. The index k may be explicitly written to a bitstream or may be inferred from the context based on a deterministic strategy applied by both G-PCC encoder 200 and G-PCC decoder 300, and n(j) is the number of skipped points which may be explicitly written to the bitstream or may be inferred from the context based on a deterministic strategy applied by both G-PCC encoder 200 and G-PCC decoder 300. n(j) is also referred to as a "phi multiplier" herein. Note, the phi multiplier is currently used only with the delta predictor.
4) Encode with each node the reconstruction residuals $(r_x, r_y, r_z)$ G-PCC decoder 300 may proceed as follows:
1) Decode the model parameters $\tilde{t}(i)$ and $\tilde{z}(i)$ and the quantization parameters $q_r, q_\zeta, q_\theta$ and $q_\phi$ 2) Decode the $(\tilde{r}, \tilde{\phi}, i)$ parameters associated with the nodes according to the geometry predictive scheme described in the text of ISO/IEC FDIS 23090-9 Geometry-based Point Cloud Compression, ISO/IEC JTC 1/SC29/WG 7 m55637, Teleconference, October 2020.
3) Compute the reconstructed coordinates $(\hat{x}, \hat{y}, \hat{z})$ as described above
4) Decode the residuals $(r_x, r_y, r_z)$
   As discussed in the next section, lossy compression could be supported by quantizing the reconstruction residuals $(r_x, r_y, r_z)$
5) Compute the original coordinates $(x, y, z)$ as follows $$x = r_x + \hat{x}$$

$$y = r_y + \hat{y}$$

$$z = r_z + \hat{z}$$

Lossy compression may be achieved by applying quantization to the reconstruction residuals $(r_x, r_y, r_z)$ or by dropping points.

The quantized reconstruction residuals may be computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_y} + o_y\right)$$

$$\tilde{r}_z = \text{sign}(r_z) \times \text{floor}\left(\frac{|r_z|}{q_z} + o_z\right)$$

Where $(q_x, o_x)$, $(q_y, o_y)$ and $(q_z, o_z)$ are quantization parameters controlling the precision of $\tilde{r}_x$, $\tilde{r}_y$ and $\tilde{r}_z$, respectively. For example, G-PCC encoder 200 or G-PCC decoder 300 may compute the quantized residuals.

G-PCC encoder 200 or G-PCC decoder 300 may use trellis quantization to further improve the RD (rate-distortion) performance results.

The quantization parameters may change at sequence/frame/slice/block level to achieve region adaptive quality and/or for rate control purposes.

Different types of sensors that may be used with system 100 are now discussed. Autonomous driving solutions may utilize accurate mapping of the environment to aid navigation. Several LIDAR systems are prevalent, and different technologies are used for the LIDAR sensors. An overview of examples of such systems is available in S. Royo and M. Ballesta-Garcia, An overview of LIDAR imaging systems for autonomous vehicles, Journal of Applied Sciences, 2019, 9(19), 4093; https://doi.org/10.3390/app9194093. Of these example systems, rotating LIDAR sensors and solid-state sensors are discussed in this document.

Rotating LIDAR systems are common systems, where one or more laser sources and detectors are mounted on a rotating structure. Each laser source, typically, is directed at different elevation angle and the laser scans the surrounding objects/regions. Several rotations may occur every second and reflected light is captured by the detectors. Rotating LIDAR can capture 360-degree field-of-view (FOV). However, due to the mechanical system involved for the rotation, these sensors are typically large and bulky. Examples of rotating LIDAR sensors include Velodyne sensors VLP-16, Alpha Prime and many others.

Solid-state LIDAR systems also may be used in capturing a surrounding environment. These systems work in a different way than rotating LIDAR systems. The solid-state sensors typically have a lower spatial volume as they do not contain large mechanical systems (as in rotating sensors). Due to their smaller size and limited field-of-view, multiple solid-state LIDARs are typically used in several applications. Each sensor may be used to capture one region of the FOV.

A LIDAR system may contain one or more laser sources and detectors/sensors, and each sensor may capture points (e.g., of a point cloud) in a pre-determined order. This order, which may be called a capture order or scan order, may be proprietary and/or may have some dependence on the mechanics of the laser/sensor system. For example, for a rotating LIDAR system, each sensor may capture points in the order of rotation.

When points are coded using G-PCC encoder 200 or G-PCC decoder 300, or other point cloud compression codecs, points belonging to different lasers and/or sensors are typically coded together. When the point cloud is coded using predictive geometry, a prediction tree may be generated. Sub-optimal construction of the prediction tree may result in coding inefficiencies. Therefore, it may be desirable to generate the prediction tree such that predictive geometry coding can take advantage of the inherent dependencies between the various points of the sensor.

Not all LIDAR systems rotate a full 360 degrees. For example, some LIDAR systems may sweep through a more restricted range (e.g., 120 degrees) and then return to a starting angle to perform a next sweep. As such, consecutive points, e.g., in a scanning or capture order, may at times, be in very different locations and one point may not provide for an accurate prediction of the next successive point.

The techniques of this disclosure may be implemented independently or together in any combination.

A first prediction tree branch may be constructed by connecting points that are successively captured by a sensor. The first point, sequentially, in a particular prediction tree branch may be called the main node or the root node of the particular prediction tree branch.

In one example, a prediction tree branch may be constructed from successive points that are presented to G-PCC encoder 200, e.g., in a coding order, which may or may not be the same as the capture order. For example, G-PCC encoder 200 or G-PCC decoder 300 may construct a prediction tree branch from successive points in a coding order and/or a capture order.

A first azimuth threshold may be specified to indicate a maximum azimuth difference between adjacent points in a first prediction tree branch. When an azimuth difference between two successive points (e.g., point A and then point B, where point B is succeeding point A) in the first prediction tree branch exceeds the first threshold, the first prediction tree branch may be terminated at point A. For example, G-PCC encoder 200 or G-PCC decoder 300 may terminate the first prediction tree branch at a first of two successive points when the azimuth difference between the two successive points exceeds the first threshold, making the first of the two successive points a leaf node of the first prediction tree branch and beginning a second prediction tree branch with the second of the successive points.

While various thresholds and comparisons to thresholds are discussed herein, it should be understood that a determination of whether a difference is greater than (e.g., exceeds) a threshold may be replaced by a determination of whether a difference is greater than or equal to the threshold, or vice versa. Additionally, a determination of whether a difference is less than a threshold, may be replaced by a determination of whether a difference is less than or equal to the threshold, or vice versa.

When an azimuth difference between two successive points (e.g., point A and then point B, where point B is succeeding point A) in an order exceeds (or is greater than or equal to) the first azimuth threshold, a new prediction tree branch (e.g., a second prediction tree branch) may be commenced at point B; point B may be the main node of this new prediction branch. For example, G-PCC encoder 200 or G-PCC decoder 300 may start a second prediction tree branch at point B when the azimuth difference between the two successive points exceeds the first azimuth threshold. In this manner, when an azimuth difference between two successive points is relatively large, the second of those two successive points may be used to start a new prediction tree branch, rather than follow the first of those two successive points in an existing prediction tree branch. For example, the second of the two successive points may be closer to a previous point other than the first of those two successive points and it may be more appropriate to predict the second of the two successive points using a point other than the first of the two successive points.

The first azimuth threshold may be signaled in the bitstream (in the sequence parameter set (SPS), geometry parameter set (GPS), or slice) or may be pre-determined for G-PCC encoder 200 and G-PCC decoder 300. In one example, the first threshold may be restricted to be a non-negative number. In another example, the first threshold may be a negative number. In another alternative, a positive and a negative threshold may be specified (for example, signaled). For example, T1 and T2 may be positive and negative thresholds, respectively. In such an example, the condition for starting a new prediction tree branch may be specified as follows: If the difference in the azimuth between consecutive points (e.g., the azimuth difference) is both greater than T2 and less than T1, then the second point of the consecutive points is added to the current prediction tree branch. If the azimuth difference is not both greater than T2 and less than T1, the second point of the consecutive points is added to a new prediction tree branch. For example, G-PCC encoder 200 or G-PCC decoder 300 may apply such a condition.

G-PCC encoder 200 or G-PCC decoder 300 may connect a first prediction tree branch and a second prediction tree branch by adding the main node of the first prediction tree branch as a child node of one of the nodes in the second prediction tree branch. In one example, the main node of the first prediction tree branch is added as a child node of the main node of the second prediction tree branch. Similarly, G-PCC encoder 200 or G-PCC decoder 300 may connect a first prediction tree branch and a second prediction tree branch by adding the main node of the second prediction tree branch as a child node of one of the nodes in the first prediction tree branch. In one example, the main node of the second prediction tree branch is added as a child node of the main node of the first prediction tree branch.

In another example, the main node of the first prediction tree branch, M1, is added as a child node of a first node in the second prediction tree branch. The first node may be chosen among the nodes of the second prediction tree branch as the node having the shortest distance to M1. Similarly, the main node of the second prediction tree branch, M2, may be added as a child node of a first node in the first prediction tree branch. The first node may be chosen among the nodes of the first prediction tree branch as the node having the shortest distance to M2.

In a further example, a number of points, N1, may be chosen. The main node of the first prediction tree branch, M1, may be added as a child node of a first node in the second prediction tree branch. For example, the first node may be chosen among the first N1 nodes of the second prediction tree branch such that the first node has the shortest distance to M1. Similarly, the main node of the second prediction tree branch, M2, may be added as a child node of a first node in the first prediction tree branch. For example, the first node may be chosen among the first N1 nodes of the first prediction tree branch such that the first node has the shortest distance to M2.

When two prediction tree branches are joined using one of the techniques disclosed above, the resultant tree structure may be called a sub-tree of the first prediction tree branch and the second prediction tree branch. The main node of the second prediction tree branch may be considered as the main node of the sub-tree.

Although the discussion above is for a combination of branches into sub-trees, the techniques may also be applicable when two sub-trees are combined, or when a branch is combined with a sub-tree. In these cases, the results tree structure may still be referred as a sub-tree.

G-PCC encoder 200 may specify a scan row identifier (ID) for each point of point cloud data. The scan row ID may specify a row in the raster scan order (or zig-zag order) of capture. Each point coordinate may be specified with a radius, azimuth and a scan row ID, and a residual in cartesian coordinates. The point coordinates may be coded in the cartesian coordinate domain, e.g., radius, azimuth and scan row ID, with an optional residual in the x, y and z coordinates. One or more characteristics associated with a scan row ID may be signaled in the bitstream by G-PCC encoder 200, e.g., an elevation angle associated with the scan row, or an z elevation associated with the scan row.

An example implementation is now described. In this example, implementation a raster scan jump causes a relatively large negative value in a difference (azimuth(next point)−azimuth(current point)) between an azimuth value of a next point and an azimuth value of a current point. The points described below include points belonging to, or captured by, a sensor. Starting with the first point P(1); point P(1) may be the root node of the prediction tree. A prediction tree branch of points may be started at P(1). G-PCC encoder 200 or G-PCC decoder 300 may keep traversing the points (e.g., in order of capture) and add points to the prediction tree as a linear prediction tree branch. This may continue as long as azimuth(next point)−azimuth(current point)>threshold, for example. This threshold, which may be a first azimuth threshold, may be small to cover any noise. In some examples, this threshold may be derived based on sampling distance of the LiDAR system, if known. At the end of the traversing of points, there may be one long chain of points with P(1) as the root.

Figure 7:
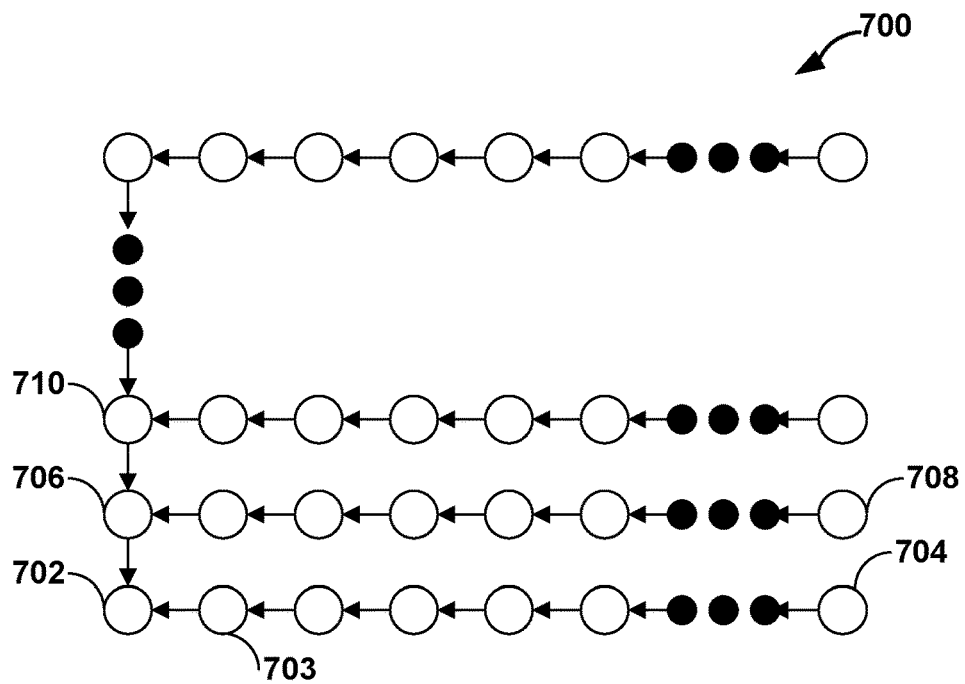
FIG. 7 is a conceptual diagram of an example prediction tree according to one or more aspects of this disclosure.

FIG. 7 is a conceptual diagram of an example prediction tree according to one or more aspects of this disclosure. Prediction tree 700 may be a prediction tree generated by G-PCC encoder 200 or G-PCC decoder 300. For example, G-PCC encoder 200 or G-PCC decoder 300 may use point 702 as a root node for a first tree branch going from point 702 to point 704. For each pair of consecutive points between points 702 and 704, the value of azimuth(next point)−azimuth(current point)>threshold. For example, the value of azimuth(point 703)−azimuth(point 702)>threshold. This chain of points from point 702 to point 704 may make up the long chain of points described above. In this case, point 702 corresponds to point P(1).

When azimuth(next point)−azimuth(curr point)≤threshold (e.g., if there is a big jump as in a raster scan jump, this difference may be large negative value and thus be less than or equal to the threshold), and where the next point is P(2), G-PCC encoder 200 or G-PCC decoder 300 may start a new prediction tree branch starting from P(2), and add P(2) as a child to P(1). G-PCC encoder 200 or G-PCC decoder 300 may then continue traversing points as described above to populate the new prediction tree branch starting at P(2). For example, point 706 may be a root point for a second tree branch going from point 706 to point 708. For example, azimuth(point 706)−azimuth(point 704)≤threshold, such that a new branch of prediction tree 700 should be started.

At the next jump (e.g., the next time azimuth(next point)−azimuth(curr point)≤threshold), add point P(n+1) as child to P(n) and continue to populate the linear prediction branch starting at P(n+1). For example, G-PCC encoder 200 or G-PCC decoder 300 may add point 710 as a root node for a third prediction branch because azimuth(point 710)−azimuth(point 708)≤threshold.

It should be noted that in examples where a raster scan jump causes a large positive value in azimuth(next point)−azimuth(curr point) rather than a large negative value, the signs used above may be flipped. In other words, when azimuth(next point)−azimuth(current point)<threshold, G-PCC encoder 200 or G-PCC decoder 300 may add the next point as another point in the current prediction tree branch and when azimuth(next point)−azimuth(curr point) ≥threshold, G-PCC encoder 200 or G-PCC decoder 300 may add the next point as a root point of a new prediction tree branch.

G-PCC encoder 200 or G-PCC decoder 300 may repeat these techniques until all the points of the sensor are included in the prediction tree. The resultant prediction tree 700 may be similar to a default tree of G-PCC.

In some examples, the prediction tree generated for each sensor may be combined together with one or more prediction tree(s) generated by other sensor(s) (e.g., by adding the root node of one sensor prediction tree as a child to one of the nodes of another sensor prediction tree), or may be coded separately (within the same slice or in different slices).

In another example implementation, G-PCC encoder 200 or G-PCC decoder 300 may start with the first point P(1) and start a new prediction tree branch of points at P(1). In this example, implementation a raster scan jump causes a relatively large negative value in a difference (azimuth(next point)−azimuth(current point)) between an azimuth value of a next point and an azimuth value of a current point. G-PCC encoder 200 or G-PCC decoder 300 may keep traversing the points (e.g., in order of capture) and add points to the prediction tree as a linear prediction tree branch. This may continue as long as azimuth(next point)−azimuth(curr point)>threshold. This threshold may be small to cover any noise. In some examples, this threshold may be derived based on sampling distance of the LiDAR system, if known. At the end of the traversing of points, there may be one long chain of points with P(1) as the root.

Figure 8:
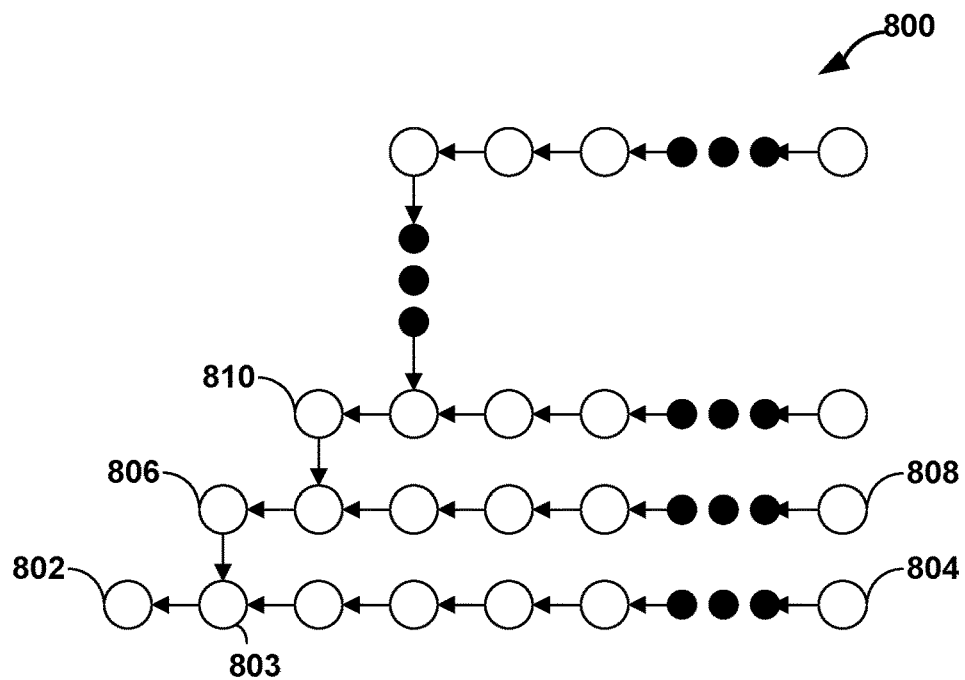
FIG. 8 is a conceptual diagram of another example prediction tree according to one or more aspects of this disclosure.

FIG. 8 is a conceptual diagram of another example prediction tree according to one or more aspects of this disclosure. Prediction tree 800 is similar to prediction tree 700 except that the root nodes of successive branches do not point to the previous branch's root node, but instead point to another node of the previous branch. For example, G-PCC encoder 200 or G-PCC decoder 300 may use point 802 as a root node for a first tree branch going from point 802 to point 804. For each pair of consecutive points between points 802 and 804, the value of azimuth(next point)−azimuth(current point)>threshold. This chain of points from point 802 to point 804 may make up the long chain of points described above. In this case, point 802 corresponds to point P(1).

When azimuth(next point)−azimuth(curr point)≤threshold (e.g., if there is a big jump as in the raster jump, this difference may be large negative value and thus be less than or equal to the threshold), and where the next point is P(2), G-PCC encoder 200 or G-PCC decoder 300 may start a new prediction tree branch starting from P(2), and add P(2) as a child to a node in the prediction tree branch starting at P(1) that is closest to P(2). G-PCC encoder 200 or G-PCC decoder 300 may then continue traversing points as described above to populate the new prediction tree branch starting at P(2). For example, point 806 may be a root point for a second tree branch going from point 806 to point 808. For example, azimuth(point 806)−azimuth(point 804) ≤threshold, such that a new branch of prediction tree 800 should be started. In this example, point 806 may be closest to point 803. As such, G-PCC encoder 200 or G-PCC decoder 300 may start the second prediction tree branch with point 806 as the root node from the node associated with point 803.

At the next jump (e.g., the next time azimuth(next point)− azimuth(curr point)≤threshold), G-PCC encoder 200 or G-PCC decoder 300 may add point P(n+1) as child to a node in the prediction tree branch starting at P(n) that is closest to P(n+1) and continue to populate the linear prediction tree branch starting at P(n+1). For example, G-PCC encoder 200 or G-PCC decoder 300 may add point 810 as a root node for a third prediction branch because azimuth(point 810)−azimuth(point 808)≤threshold.

It should be noted that in implementations where a raster scan jump causes a large positive value in azimuth(next point)−azimuth(curr point) rather than a large negative value, the signs used above may be flipped. In other words, when azimuth(next point)−azimuth(current point)<threshold, G-PCC encoder 200 or G-PCC decoder 300 may add the next point as another point in the current prediction tree branch and when azimuth(next point)−azimuth(curr point) ≥threshold, G-PCC encoder 200 or G-PCC decoder 300 may add the next point as a root point of a new prediction tree branch.

G-PCC encoder 200 or G-PCC decoder 300 may repeat these techniques until all the points of the sensor are included in the prediction tree. The resultant prediction tree 800 may be similar to a default tree of G-PCC.

Figure 9:
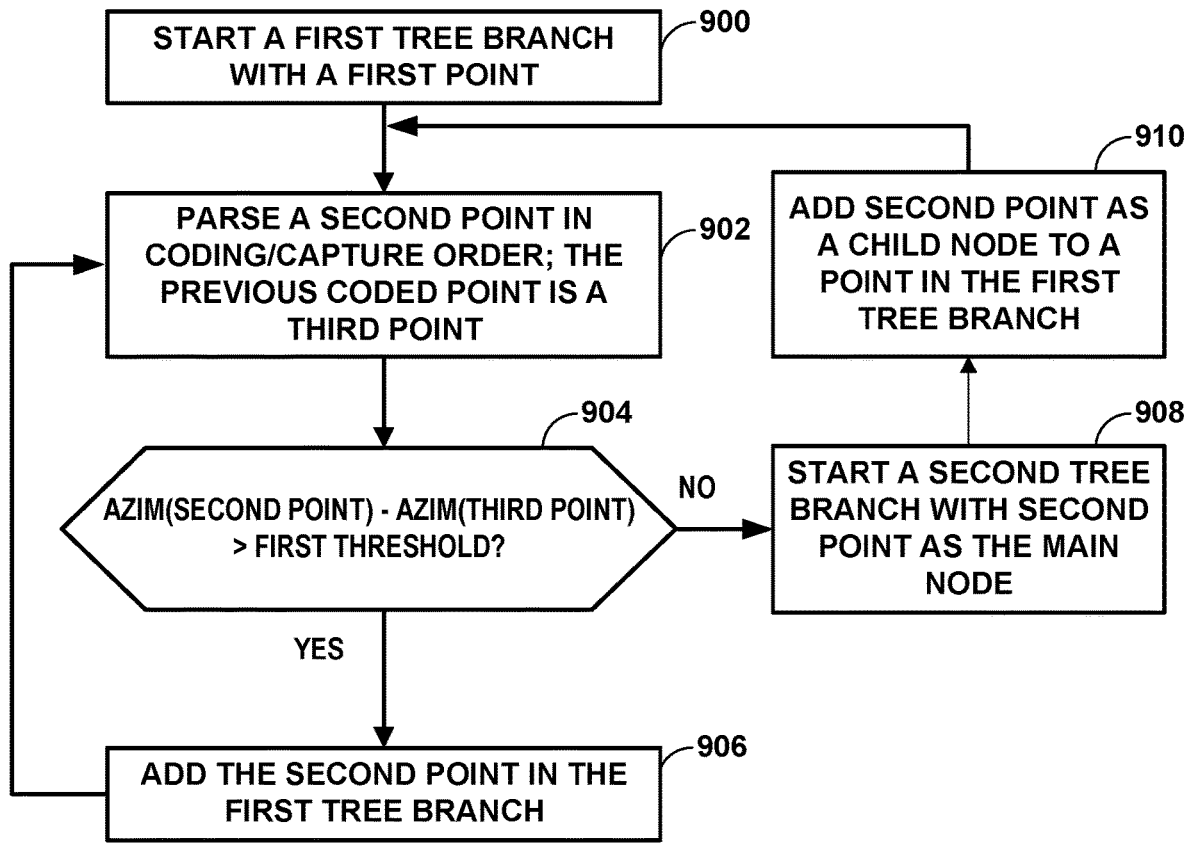
FIG. 9 is a flow diagram illustrating example techniques for generation of a prediction tree according to one or more aspects of this disclosure.

FIG. 9 is a flow diagram illustrating example techniques for generation of a prediction tree according to one or more aspects of this disclosure. G-PCC encoder 200 or G-PCC decoder 300 may start a first prediction tree branch with (e.g., using) a first point of point cloud data (900). For example, a first point is used to start a first prediction tree branch and may be a root node of the first prediction tree branch. G-PCC encoder 200 or G-PCC decoder 300 may parse (e.g., decode) a second point in coding/capture order (902). For example, a second point is coded, where a third point (in the Example of FIG. 9) is the point coded/captured preceding the second point (e.g., the third point was coded or captured prior to the second point). The third point may also be part of the first prediction tree branch. G-PCC encoder 200 or G-PCC decoder 300 may determine whether the azimuth of the second point minus the azimuth of the third point (e.g., the azimuth difference) is greater than a first threshold (e.g., a first azimuth threshold) (904). If the azimuth of the second point minus the azimuth of the third point is greater than a first threshold (the "YES" branch from box 904), G-PCC encoder 200 or G-PCC decoder 300 may add the second point to the first prediction tree branch (906). For example, if the azimuth of the second point minus the azimuth of the third point is greater than a first threshold, the second point may be added to the first prediction tree branch. Otherwise, a second prediction tree branch is started with the second point as the main/root node. For example, if the azimuth of the second point minus the azimuth of the third point is not greater than a first threshold (the "NO" branch from box 904), G-PCC encoder 200 or G-PCC decoder 300 start a second prediction tree branch with the second point as the main or root node (908). G-PCC encoder 200 or G-PCC decoder 300 may add the second point as a child node to one of the nodes in the first prediction tree branch (910).

Another example implementation is now described. This example may be similar to that described above with respect to FIG. 8, except that G-PCC encoder 200 or G-PCC decoder 300 may utilize an absolute value of azimuth differences rather than actual azimuth differences. In such a case, the manner in which G-PCC encoder 200 or G-PCC decoder 300 utilizes the threshold may change as described below.

G-PCC encoder 200 or G-PCC decoder 300 may start a new prediction tree branch of points at P(1). G-PCC encoder 200 or G-PCC decoder 300 may keep traversing the points (e.g., in order of capture) and add points to the prediction tree as a linear prediction tree branch. This may continue as long as absolute value of the difference azimuth(next point)− azimuth(curr point) is smaller than (or smaller or equal to) a threshold. This threshold may be large enough to cover any noise. In some examples, this threshold may be derived based on a sampling distance of the LiDAR system, if known, or an azimuth jump in the case where the LiDAR system uses raster scans. At the end of the traversing of points, the prediction tree branch may include one long chain of points with P(1) as the root.

When ABS(azimuth(next point)−azimuth(curr point)) >threshold (e.g., if there is a big jump as in a raster jump), and where the next point is P(2), G-PCC encoder 200 or G-PCC decoder 300 may start a new prediction tree branch starting from P(2), and add P(2) as a child to a node in the prediction tree branch starting at P(1) that is closest to P(2). G-PCC encoder 200 or G-PCC decoder 300 may then continue traversing points as described above to populate the new prediction tree branch starting at P(2).

At the next jump (e.g., the next time ABS(azimuth(next point)−azimuth(curr point))>threshold), add point P(n+1) as child to a node in the prediction tree branch starting at P(n) that is closest to P(n+1) and continue to populate the linear prediction tree branch starting at P(n+1).

G-PCC encoder 200 or G-PCC decoder 300 may repeat these techniques until all the points of the point cloud sensed by the sensor are included in the prediction tree. The resultant tree may be similar to a default tree of G-PCC.

Another example implementation is now described. This example may be similar to that described above with respect to FIG. 7, except that G-PCC encoder 200 or G-PCC decoder 300 may utilize an absolute value of azimuth differences rather than actual azimuth differences. In such a case, the manner in which G-PCC encoder 200 or G-PCC decoder 300 utilizes the threshold may change as described below.

G-PCC encoder 200 or G-PCC decoder 300 may start a new prediction tree branch of points at P(1). G-PCC encoder 200 or G-PCC decoder 300 may keep traversing the points (e.g., in order of capture) and add points to the tree as a linear prediction tree branch. This may continue as long as absolute value of the difference azimuth(next point)−azimuth (curr point) is smaller than (or smaller than or equal to) a threshold. This threshold may be large enough to cover any noise. In some examples, this threshold may be derived based on a sampling distance of the LiDAR system if known, or an azimuth jump in case the LiDAR system uses raster scans. At the end of the traversing of points, the prediction tree branch may include one long chain of points with P(1) as the root.

When ABS(azimuth(next point)−azimuth(curr point)) >threshold (e.g., if there is a big jump as in the raster jump), and where the next point is P(2), G-PCC encoder 200 or G-PCC decoder 300 may start a new prediction tree branch starting from P(2), and add P(2) as a child to P(1). G-PCC encoder 200 or G-PCC decoder 300 may then continue traversing points as described above to populate the new prediction tree branch starting at P(2).

At the next jump (e.g., the next time ABS(azimuth(next point)−azimuth(curr point))>threshold), G-PCC encoder 200 or G-PCC decoder 300 may add point P(n+1) as child to P(n) and continue to populate the linear prediction tree branch starting at P(n+1).

G-PCC encoder 200 or G-PCC decoder 300 may repeat these techniques until all the points of the sensor are included in the tree.

Figure 10:
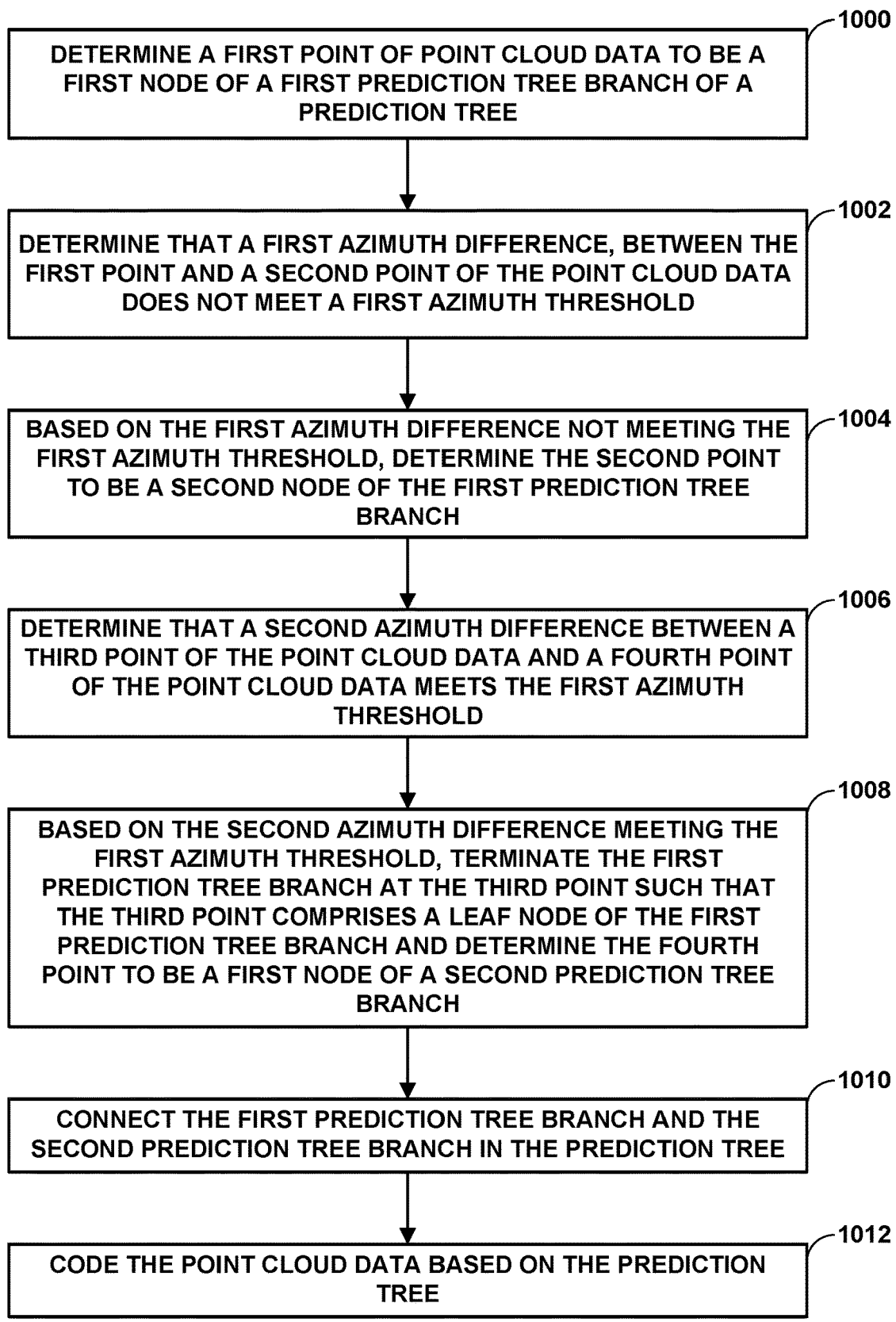
FIG. 10 is a flow diagram illustrating example prediction tree generation techniques according to one or more aspects of this disclosure.

FIG. 10 is a flow diagram illustrating example prediction tree generation techniques according to one or more aspects of this disclosure. G-PCC encoder 200 or G-PCC decoder 300 may determine a first point of the point cloud data to be a first node of a first prediction tree branch of a prediction tree (1000).

G-PCC encoder 200 or G-PCC decoder 300 may determine that a first azimuth difference, between a first point of the point cloud data and an immediately previous point of the point cloud data in an order, does not meet a first azimuth threshold (1002). For example, G-PCC encoder 200 or G-PCC decoder 300 may determine the first azimuth difference as a difference between azimuth values of the first point (e.g., point 702) and the second point (e.g., point 703). G-PCC encoder 200 or G-PCC decoder 300 may compare the first azimuth difference to the first azimuth threshold to determine that the first azimuth difference does not meet the first azimuth threshold.

Based on the first azimuth difference not meeting the first azimuth threshold, G-PCC encoder 200 or G-PCC decoder 300 may determine the second point to be a second node of the first prediction tree branch (1004). For example, G-PCC encoder 200 or G-PCC decoder 300 may add the second point to the first prediction tree branch, for example, from the first point (e.g., immediately adjacent to the first point) so as to further build the first prediction tree branch.

G-PCC encoder 200 or G-PCC decoder 300 may determine that a second azimuth difference between a third point of the point cloud data and a fourth point of the point cloud data meets the first azimuth threshold (1006). The third point (e.g., point 704) and the fourth point (e.g., point 706) comprise successive points in the order and the third point comprises a third node of the first prediction tree branch. For example, G-PCC encoder 200 or G-PCC decoder 300 may determine the second azimuth difference as a difference between azimuth values of the third point and the fourth point, the third point being immediately previous to the fourth point in the order. G-PCC encoder 200 or G-PCC decoder 300 may compare the second azimuth difference to the first azimuth threshold to determine that the second azimuth difference meets the first azimuth threshold.

Based on the second azimuth difference meeting the first azimuth threshold, G-PCC encoder 200 or G-PCC decoder 300 may terminate the first prediction tree branch at the third point such that the third point comprises a leaf node of the first prediction tree branch and determine the fourth point to be a first node of a second prediction tree branch (1108). For example, G-PCC encoder 200 or G-PCC decoder 300 may begin the second prediction tree branch with the fourth point as the main node or root node of the second prediction tree branch. In other words, G-PCC encoder 200 or G-PCC decoder 300 may start the second prediction tree branch with the fourth point.

G-PCC encoder 200 or G-PCC decoder 300 may connect the first prediction tree branch and the second prediction tree branch in the prediction tree (1010). For example, G-PCC encoder 200 or G-PCC decoder 300 may connect the fourth point (e.g., the main node or root node of the second prediction tree branch) to a particular node of the first prediction tree branch.

G-PCC encoder 200 or G-PCC decoder 300 may code the point cloud data based on the prediction tree (1012). For example, G-PCC encoder 200 may encode the point cloud data based on the prediction tree or G-PCC decoder 300 may decode the point cloud data based on the prediction tree.

In some examples, as part of connecting the first prediction tree branch and the second prediction tree branch, G-PCC encoder 200 or G-PCC decoder 300 are configured to add the first node of the second prediction tree branch as a child node of a first node of the first prediction tree branch. In some examples, the first node of the first prediction tree branch is the root node of the prediction tree.

In some examples, as part of connecting the first prediction tree branch and the second prediction tree branch, G-PCC encoder 200 or G-PCC decoder 300 are configured to add the first node of the second prediction tree branch as a child node of a node of the first prediction tree branch having a respective point of the point cloud data with a shortest distance to the fourth point from among all nodes of the first prediction tree branch.

In some examples, as part of connecting the first prediction tree branch and the second prediction tree branch, G-PCC encoder 200 or G-PCC decoder 300 are configured to add the first node of the second prediction tree branch as a child node of a node of the first prediction tree branch having a respective point of the point cloud data having a shortest distance to the fourth point from among a predetermined number of nodes of the first prediction tree branch.

In some examples, the order includes at least one of a sensor capture order or a coding order. In some examples, G-PCC encoder 200 or G-PCC decoder 300 are further configured to signal or parse the first azimuth threshold in a bitstream. In some examples, the first azimuth threshold includes one of a non-negative number or a negative number.

In some examples, the first azimuth threshold includes a non-negative number, wherein a second azimuth threshold includes a negative number. In some examples, as part of determining that the second azimuth difference meets the first azimuth threshold, G-PCC encoder 200 or G-PCC decoder 300 are configured to determine that the second azimuth difference is a) less than the first azimuth threshold or b) less than or equal to the first azimuth threshold, and are configured to terminate the first prediction tree branch at the third point further based on a determination that the second azimuth difference is c) greater than or equal to second azimuth threshold or d) greater than the second azimuth threshold.

In some examples, as part of determining that the second azimuth difference meets the first azimuth threshold, G-PCC encoder 200 or G-PCC decoder 300 are configured to determine that the second azimuth difference is a) less than or equal to the first azimuth threshold or b) less than the first azimuth threshold.

In some examples, as part of determining that the second azimuth difference meets the first azimuth threshold, G-PCC encoder 200 or G-PCC decoder 300 are configured to determine that an absolute value of the second azimuth difference is a) greater than the first azimuth threshold or b) greater than or equal to the first azimuth threshold.

In some examples, G-PCC encoder 200 or G-PCC decoder 300 are further configured to determine a first scan row ID for the third point, and determine a second scan row ID for the fourth point. In some examples, G-PCC encoder 200 or G-PCC decoder 300 are further configured to signal or parse one or more characteristics associated with at least one of the first scan row ID or the second scan row ID in a bitstream. In some examples, G-PCC encoder 200 or G-PCC decoder 300 are further configured to generate the point cloud.

Figure 11:
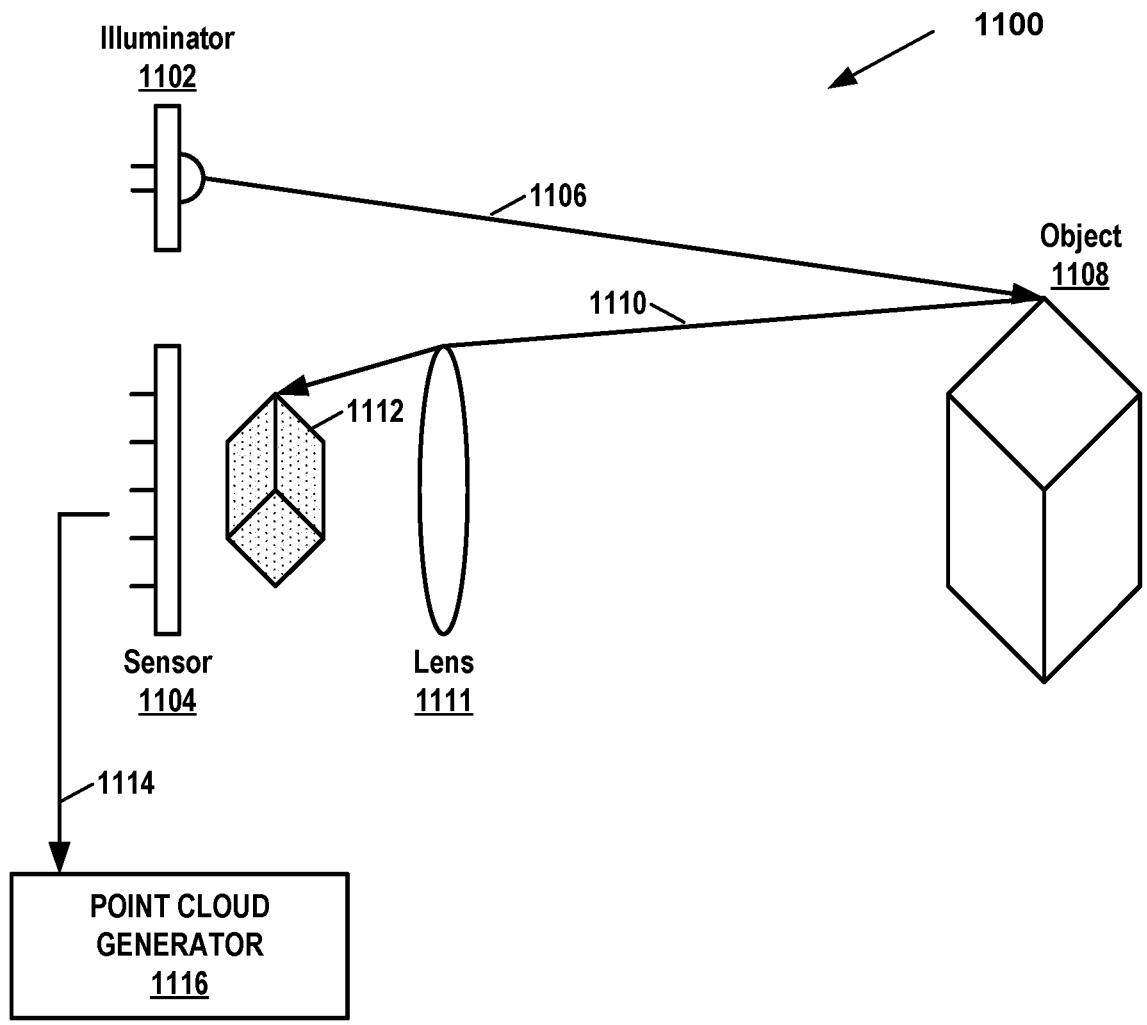
FIG. 11 is a conceptual diagram illustrating an example range-finding system 1100 that may be used with one or more techniques of this disclosure for coordinate conversion in G-PCC.

FIG. 11 is a conceptual diagram illustrating an example range-finding system 1100 that may be used with one or more techniques of this disclosure for coordinate conversion in G-PCC. In the example of FIG. 11, range-finding system 1100 includes an illuminator 1102 and a sensor 1104. Illuminator 1102 may emit light 1106. In some examples, illuminator 1102 may emit light 1106 as one or more laser beams. Light 1106 may be in one or more wavelengths, such as an infrared wavelength or a visible light wavelength. In other examples, light 1106 is not coherent, laser light. When light 1106 encounters an object, such as object 1108, light 1106 creates returning light 1110. Returning light 1110 may include backscattered and/or reflected light. Returning light 1110 may pass through a lens 1111 that directs returning light 1110 to create an image 1112 of object 1708 on sensor 1104. Sensor 1104 generates signals 1114 based on image 1112. Image 1112 may comprise a set of points (e.g., as represented by dots in image 1112 of FIG. 11).

In some examples, illuminator 1102 and sensor 1104 may be mounted on a spinning structure so that illuminator 1102 and sensor 1104 capture a 360-degree view of an environment (e.g., a spinning LIDAR sensor). In other examples, range-finding system 1100 may include one or more optical components (e.g., mirrors, collimators, diffraction gratings, etc.) that enable illuminator 1102 and sensor 1104 to detect ranges of objects within a specific range (e.g., up to 360-degrees). Although the example of FIG. 11 only shows a single illuminator 1102 and sensor 1104, range-finding system 1100 may include multiple sets of illuminators and sensors.

In some examples, illuminator 1102 generates a structured light pattern. In such examples, range-finding system 1100 may include multiple sensors 1104 upon which respective images of the structured light pattern are formed. Range-finding system 1100 may use disparities between the images of the structured light pattern to determine a distance to an object 1108 from which the structured light pattern backscatters. Structured light-based range-finding systems may have a high level of accuracy (e.g., accuracy in the sub-millimeter range), when object 1108 is relatively close to sensor 1104 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1100 is a time of flight (ToF)-based system. In some examples where range-finding system 1100 is a ToF-based system, illuminator 1102 generates pulses of light. In other words, illuminator 1102 may modulate the amplitude of emitted light 1106. In such examples, sensor 1104 detects returning light 1110 from the pulses of light 1106 generated by illuminator 1102. Range-finding system 1100 may then determine a distance to object 1108 from which light 1106 backscatters based on a delay between when light 1106 was emitted and detected and the known speed of light in air). In some examples, rather than (or in addition to) modulating the amplitude of the emitted light 1106, illuminator 1102 may modulate the phase of the emitted light 1106. In such examples, sensor 1104 may detect the phase of returning light 1110 from object 1108 and determine distances to points on object 1108 using the speed of light and based on time differences between when illuminator 1102 generated light 1106 at a specific phase and when sensor 1104 detected returning light 1110 at the specific phase.

In other examples, a point cloud may be generated without using illuminator 1102. For instance, in some examples, sensors 1104 of range-finding system 1100 may include two or more optical cameras. In such examples, range-finding system 1100 may use the optical cameras to capture stereo images of the environment, including object 1108. Range-finding system 1100 may include a point cloud generator 1116 that may calculate the disparities between locations in the stereo images. Range-finding system 1100 may then use the disparities to determine distances to the locations shown in the stereo images. From these distances, point cloud generator 1116 may generate a point cloud.

Sensors 1104 may also detect other attributes of object 1108, such as color and reflectance information. In the example of FIG. 11, a point cloud generator 1116 may generate a point cloud based on signals 1114 generated by sensor 1104. Range-finding system 1100 and/or point cloud generator 1116 may form part of data source 104 (FIG. 1). Hence, a point cloud generated by range-finding system 1100 may be encoded and/or decoded according to any of the techniques of this disclosure. Inter prediction and residual prediction, as described in this disclosure may reduce the size of the encoded data.

Figure 12:
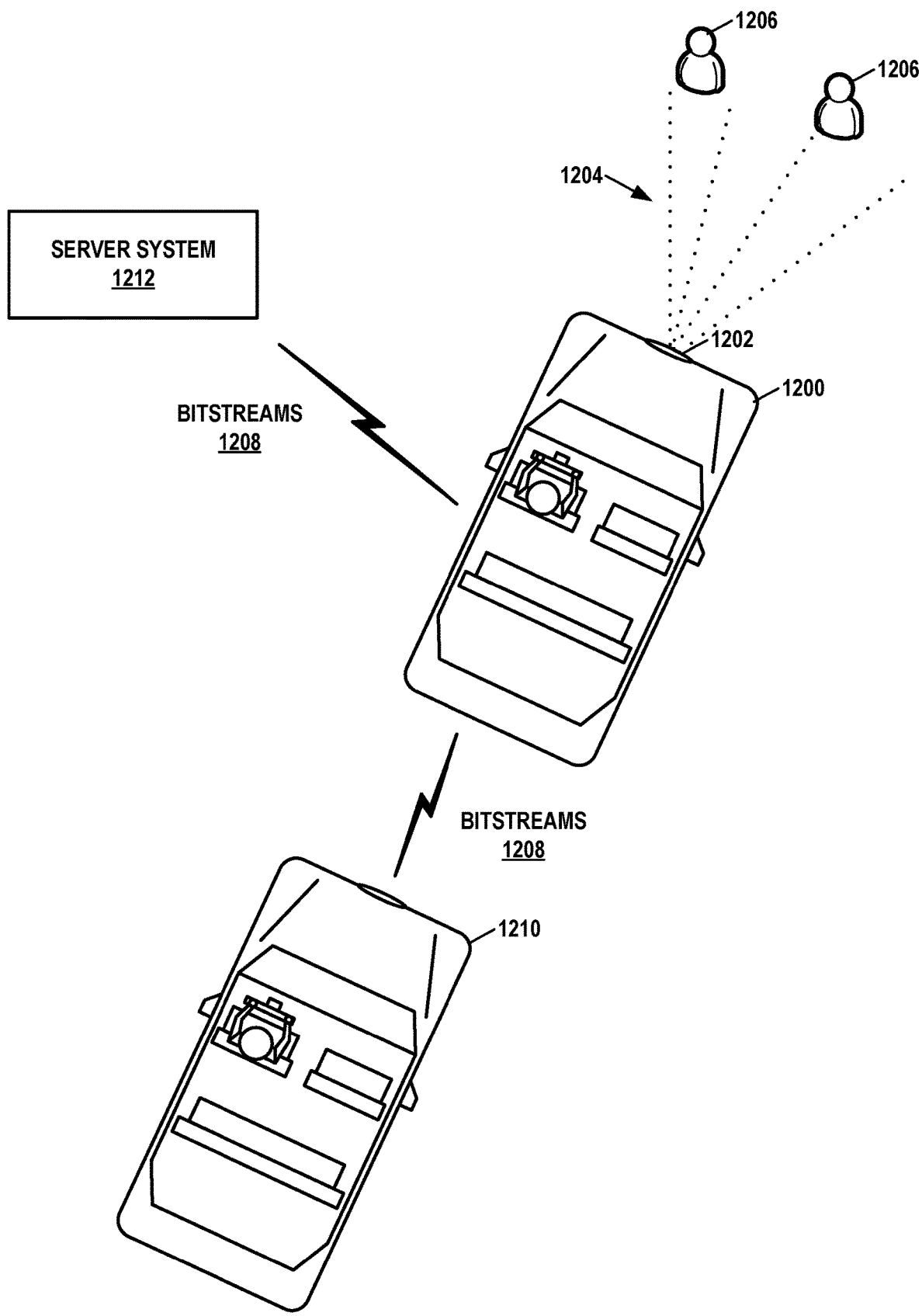
FIG. 12 is a conceptual diagram illustrating an example vehicle-based scenario in which one or more techniques of this disclosure for coordinate conversion in G-PCC may be used.

FIG. 12 is a conceptual diagram illustrating an example vehicle-based scenario in which one or more techniques of this disclosure for coordinate conversion in G-PCC may be used. In the example of FIG. 12, a vehicle 1200 includes a range-finding system 1202. Range-finding system 1202 may be implemented in the manner discussed with respect to FIG. 11. Although not shown in the example of FIG. 12, vehicle 1200 may also include a data source, such as data source 104 (FIG. 1), and a G-PCC encoder, such as G-PCC encoder 200 (FIG. 1). In the example of FIG. 12, range-finding system 1202 emits laser beams 1204 that reflect off pedestrians 1206 or other objects in a roadway. The data source of vehicle 1200 may generate a point cloud based on signals generated by range-finding system 1202. The G-PCC encoder of vehicle 1200 may encode the point cloud to generate bitstreams 1208, such as geometry bitstream (FIG. 2) and attribute bitstream (FIG. 2). Inter prediction and residual prediction, as described in this disclosure may reduce the size of the geometry bitstream. Bitstreams 1208 may include many fewer bits than the unencoded point cloud obtained by the G-PCC encoder.

An output interface of vehicle 1200 (e.g., output interface 108 (FIG. 1) may transmit bitstreams 1208 to one or more other devices. Bitstreams 1208 may include many fewer bits than the unencoded point cloud obtained by the G-PCC encoder. Thus, vehicle 1200 may be able to transmit bitstreams 1208 to other devices more quickly than the unencoded point cloud data. Additionally, bitstreams 1208 may require less data storage capacity on a device.

In the example of FIG. 12, vehicle 1200 may transmit bitstreams 1208 to another vehicle 1210. Vehicle 1210 may include a G-PCC decoder, such as G-PCC decoder 300 (FIG. 1). The G-PCC decoder of vehicle 1210 may decode bitstreams 1208 to reconstruct the point cloud. Vehicle 1210 may use the reconstructed point cloud for various purposes. For instance, vehicle 1210 may determine based on the reconstructed point cloud that pedestrians 1206 are in the roadway ahead of vehicle 1200 and therefore start slowing down, e.g., even before a driver of vehicle 1210 realizes that pedestrians 1206 are in the roadway. Thus, in some examples, vehicle 1210 may perform an autonomous navigation operation based on the reconstructed point cloud.

Additionally or alternatively, vehicle 1200 may transmit bitstreams 1208 to a server system 1212. Server system 1212 may use bitstreams 1208 for various purposes. For example, server system 1212 may store bitstreams 1208 for subsequent reconstruction of the point clouds. In this example, server system 1212 may use the point clouds along with other data (e.g., vehicle telemetry data generated by vehicle 1200) to train an autonomous driving system. In other example, server system 1212 may store bitstreams 1208 for subsequent reconstruction for forensic crash investigations.

Figure 13:
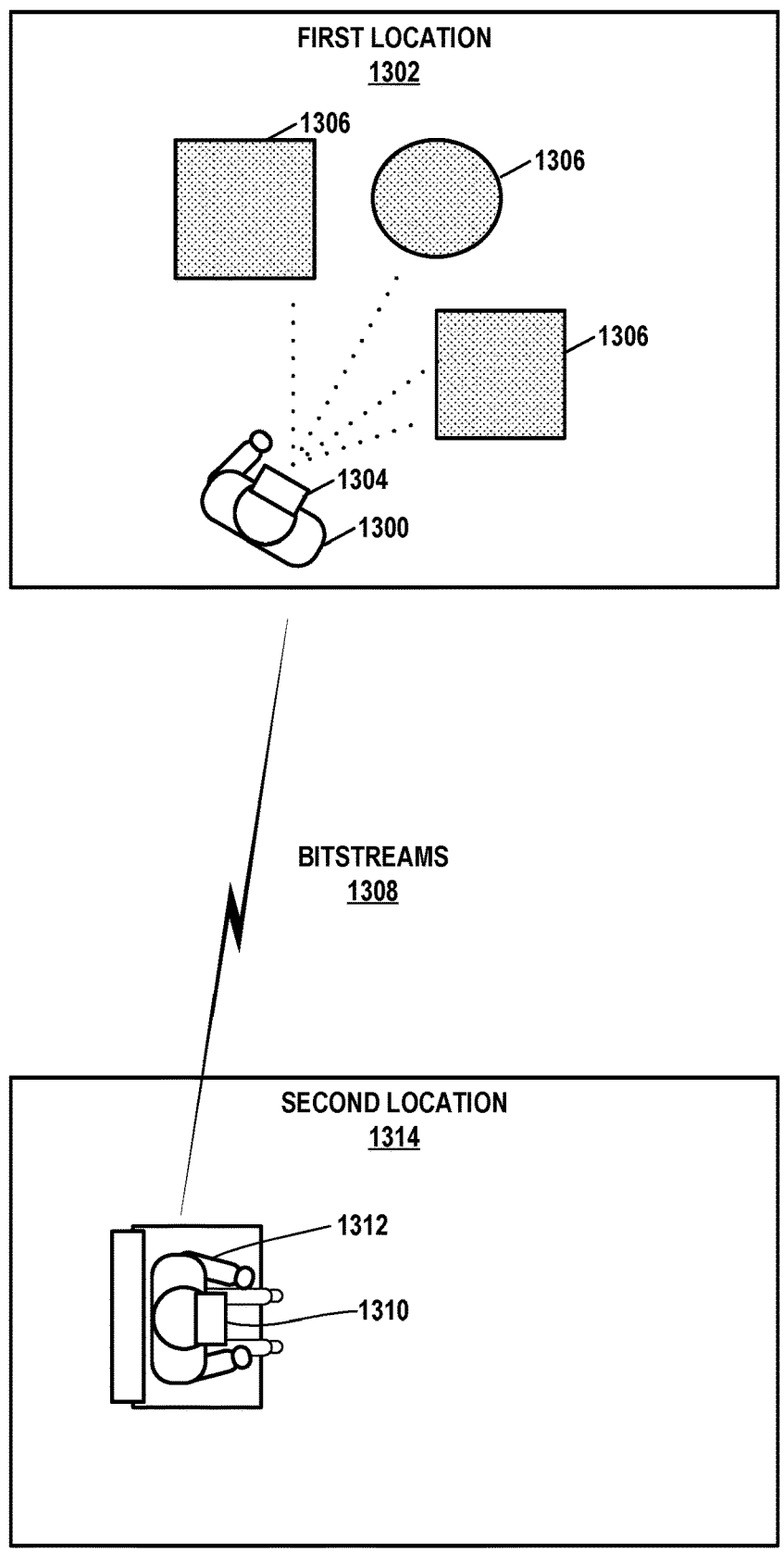
FIG. 13 is a conceptual diagram illustrating an example extended reality system in which one or more techniques of this disclosure for coordinate conversion in G-PCC may be used.

FIG. 13 is a conceptual diagram illustrating an example extended reality system in which one or more techniques of this disclosure for coordinate conversion in G-PCC may be used. Extended reality (XR) is a term used to cover a range of technologies that includes augmented reality (AR), mixed reality (MR), and virtual reality (VR). In the example of FIG. 13, a user 1300 is located in a first location 1302. User 1300 wears an XR headset 1304. As an alternative to XR headset 1304, user 1300 may use a mobile device (e.g., mobile phone, tablet computer, etc.). XR headset 1304 includes a depth detection sensor, such as a range-finding system, that detects positions of points on objects 1306 at location 1302. A data source of XR headset 1304 may use the signals generated by the depth detection sensor to generate a point cloud representation of objects 1306 at location 1302. XR headset 1304 may include a G-PCC encoder (e.g., G-PCC encoder 200 of FIG. 1) that is configured to encode the point cloud to generate bitstreams 1308. Inter prediction and residual prediction, as described in this disclosure may reduce the size of bitstream 1308.

XR headset 1304 may transmit bitstreams 1308 (e.g., via a network such as the Internet) to an XR headset 1310 worn by a user 1312 at a second location 1314. XR headset 1310 may decode bitstreams 1308 to reconstruct the point cloud. XR headset 1310 may use the point cloud to generate an XR visualization (e.g., an AR, MR, VR visualization) representing objects 1306 at location 1302. Thus, in some examples, such as when XR headset 1310 generates an VR visualization, user 1312 may have a 3D immersive experience of location 1302. In some examples, XR headset 1310 may determine a position of a virtual object based on the reconstructed point cloud. For instance, XR headset 1310 may determine, based on the reconstructed point cloud, that an environment (e.g., location 1302) includes a flat surface and then determine that a virtual object (e.g., a cartoon character) is to be positioned on the flat surface. XR headset 1310 may generate an XR visualization in which the virtual object is at the determined position. For instance, XR headset 1310 may show the cartoon character sitting on the flat surface.

Figure 14:
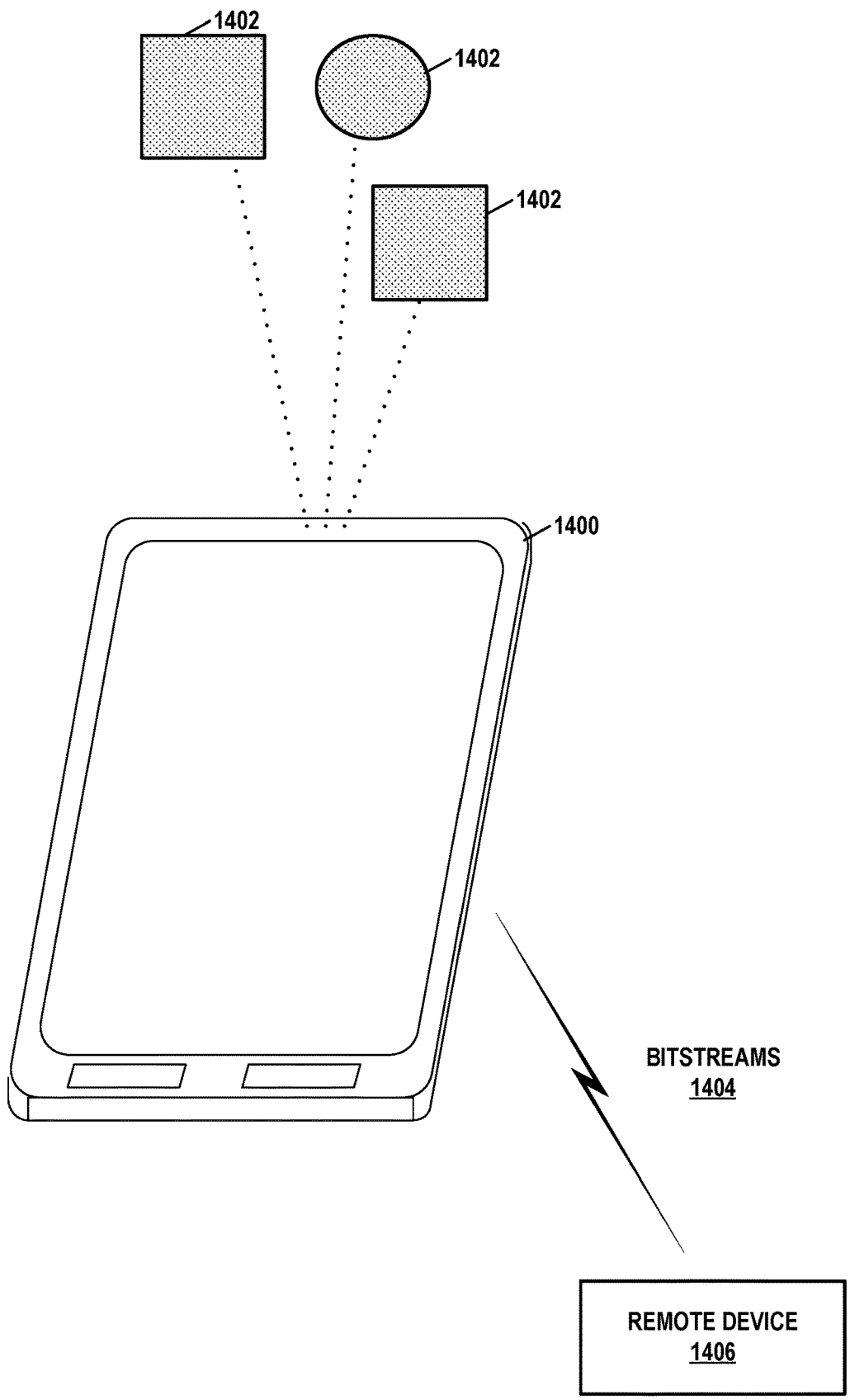
FIG. 14 is a conceptual diagram illustrating an example mobile device system in which one or more techniques of this disclosure for coordinate conversion in G-PCC may be used.

FIG. 14 is a conceptual diagram illustrating an example mobile device system in which one or more techniques of this disclosure for coordinate conversion in G-PCC may be used. In the example of FIG. 14, a mobile device 1400 (e.g., a wireless communication device), such as a mobile phone or tablet computer, includes a range-finding system, such as a LIDAR system, that detects positions of points on objects 1402 in an environment of mobile device 1400. A data source of mobile device 1400 may use the signals generated by the depth detection sensor to generate a point cloud representation of objects 1402. Mobile device 1400 may include a G-PCC encoder (e.g., G-PCC encoder 200 of FIG. 1) that is configured to encode the point cloud to generate bitstreams 1404. In the example of FIG. 14, mobile device 1400 may transmit bitstreams to a remote device 1406, such as a server system or other mobile device. Inter prediction and residual prediction, as described in this disclosure may reduce the size of bitstreams 1404. Remote device 1406 may decode bitstreams 1404 to reconstruct the point cloud. Remote device 1406 may use the point cloud for various purposes. For example, remote device 1406 may use the point cloud to generate a map of environment of mobile device 1400. For instance, remote device 1406 may generate a map of an interior of a building based on the reconstructed point cloud. In another example, remote device 1406 may generate imagery (e.g., computer graphics) based on the point cloud. For instance, remote device 1406 may use points of the point cloud as vertices of polygons and use color attributes of the points as the basis for shading the polygons. In some examples, remote device 1406 may use the reconstructed point cloud for facial recognition or other security applications.

Examples in the various aspects of this disclosure may be used individually or in any combination.

This disclosure includes the following non-limiting clauses.

Clause 1A. A method of coding point cloud data, the method comprising: determining a first point of the point cloud data to be a root node of a first prediction tree branch of a prediction tree; determining that an azimuth difference between a second point of the point cloud data and the first point meets a first azimuth threshold, wherein the first point and the second point comprise successive points in an order; based on the azimuth difference meeting the first azimuth threshold, terminating the first prediction tree branch at the first point; determining the second point to be a root node of a second prediction tree branch; and coding the point cloud data based on the prediction tree.

Clause 2A. The method of clause 1A, wherein the order comprises at least one of a sensor capture order or a coding order.

Clause 3A. The method of clause 1A or clause 2A, further comprising signaling or parsing the first azimuth threshold in a bitstream.

Clause 4A. The method of any of clauses 1A-3A, wherein the first azimuth threshold comprises one of a non-negative number or a negative number.

Clause 5A. The method of any of clauses 1A-4A, wherein the first azimuth threshold comprises a non-negative number, wherein a second azimuth threshold comprises a negative number, wherein determining that the azimuth difference meets the first azimuth threshold comprises determining that the azimuth difference is less than the first azimuth threshold, and wherein terminating the first prediction tree branch at the first point is further based on determining that the azimuth difference is greater than a second azimuth threshold, the second azimuth threshold comprising a negative number.

Clause 6A. The method of any of clauses 1A-4A, wherein determining that the azimuth difference between the second point and the first point meets a first azimuth threshold comprises determining that the azimuth difference between the second point and the first point is less than or equal to the first azimuth threshold.

Clause 7A. The method of any of clauses 1A-4A, wherein determining that the azimuth difference between the second point and the first point meets a first azimuth threshold comprises determining that an absolute value of the azimuth difference between the second point and the first point is greater than the first azimuth threshold.

Clause 8A. The method of any of clauses 1A-5A, further comprising connecting the first prediction tree branch and the second prediction tree branch.

Clause 9A. The method of clause 8A, wherein connecting the first prediction tree branch and the second prediction tree branch comprises adding the root node of the first prediction tree branch as a child node of the root node of the second prediction tree branch.

Clause 10A. The method of clause 8A, wherein connecting the first prediction tree branch and the second prediction tree branch comprises adding the root node of the first prediction tree branch as a child node of a node of the second prediction tree branch having a shortest distance to the root node of the first prediction tree branch.

Clause 11A. The method of clause 8A, wherein connecting the first prediction tree branch and the second prediction tree branch comprises adding the root node of the first prediction tree branch as a child node of a node of a predetermined number of nodes of the second prediction tree branch having a shortest distance to the root node of the first prediction tree branch.

Clause 12A. The method of any of clauses 1A-11A, further comprising: determining a first scan row ID for the first point; and determining a second scan row ID for the second point.

Clause 13A. The method of clause 12A, further comprising signaling or parsing one or more characteristics associated with at least one of the first scan row ID or the second scan row ID.

Clause 14A. A method of coding point cloud data, the method comprising: determining a first point of the point cloud data to be a root node of a first prediction tree branch of a prediction tree; determining a second point of the point cloud data; determining a third point of the point cloud data to be part of the first prediction tree branch, the third point being at least one of coded before or captured before the second point; determining whether an azimuth difference between the second point and the third point is greater than a first azimuth threshold; and based on the determination whether the azimuth difference between the second point and the third point is greater than the first azimuth threshold, add the second point to the prediction tree.

Clause 15A. The method of clause 14A, wherein the azimuth difference is greater than the first azimuth threshold and wherein adding the second point to the prediction tree comprises adding the second point to the first prediction tree branch.

Clause 16A. The method of clause 14A, wherein the azimuth difference is not greater than the first azimuth threshold and wherein adding the second point to the prediction tree comprises: adding the second point as a root node of a second prediction tree branch; and adding the second point as a child node to a node of the first prediction tree branch.

Clause 17A. The method of any of clauses 1A-16A, further comprising generating the point cloud.

Clause 18A. A device for processing a point cloud, the device comprising one or more means for performing the method of any of clauses 1A-17A.

Clause 19A. The device of clause 18A, wherein the one or more means comprise one or more processors implemented in circuitry.

Clause 20A. The device of any of clauses 18A or 19A, further comprising a memory to store the data representing the point cloud.

Clause 21A. The device of any of clauses 18A-20A, wherein the device comprises a decoder.

Clause 22A. The device of any of clauses 18A-21A, wherein the device comprises an encoder.

Clause 23A. The device of any of clauses 18A-22A, further comprising a device to generate the point cloud.

Clause 24A. The device of any of clauses 18A-23A, further comprising a display to present imagery based on the point cloud.

Clause 25A. Computer-readable storage media having stored thereon instructions that, when executed, cause one or more processors to perform the method of any of clauses 1A-17A.

Clause 1B. A device for coding point cloud data, the device comprising: one or more memories configured to store the point cloud data; and one or more processors implemented in circuitry and communicatively coupled to the one or more memories, the one or more processors being configured to: determine a first point of the point cloud data to be a first node of a first prediction tree branch of a prediction tree; determine that a first azimuth difference between the first point and a second point of the point cloud data does not meet a first azimuth threshold, wherein the first point and the second point comprise successive points in an order; based on the first azimuth difference not meeting the first azimuth threshold, determine the second point to be a second node of the first prediction tree branch; determine that a second azimuth difference between a third point of the point cloud data and a fourth point of the point cloud data meets the first azimuth threshold, wherein the third point and the fourth point comprise successive points in the order and wherein the third point comprises a third node of the first prediction tree branch; based on the second azimuth difference meeting the first azimuth threshold, terminate the first prediction tree branch at the third point such that the third point comprises a leaf node of the first prediction tree branch and determine the fourth point to be a first node of a second prediction tree branch; connect the first prediction tree branch and the second prediction tree branch in the prediction tree; and code the point cloud data based on the prediction tree.

Clause 2B. The device of clause 1B, wherein as part of connecting the first prediction tree branch and the second prediction tree branch, the one or more processors are configured to add the first node of the second prediction tree branch as a child node of a first node of the first prediction tree branch.

Clause 3B. The device of clause 2B, wherein the first node of the first prediction tree branch is a root node of the prediction tree.

Clause 4B. The device of any of clauses 1B-3B, wherein as part of connecting the first prediction tree branch and the second prediction tree branch, the one or more processors are configured to add the first node of the second prediction tree branch as a child node of a node of the first prediction tree branch having a respective point of the point cloud data with a shortest distance to the fourth point from among all nodes of the first prediction tree branch.

Clause 5B. The device of any of clauses 1B-4B, wherein as part of connecting the first prediction tree branch and the second prediction tree branch, the one or more processors are configured to add the first node of the second prediction tree branch as a child node of a node of the first prediction tree branch having a respective point of the point cloud data having a shortest distance to the fourth point from among a predetermined number of nodes of the first prediction tree branch.

Clause 6B. The device of any of clauses 1B-5B, wherein the order comprises at least one of a sensor capture order or a coding order.

Clause 7B. The device of any of clauses 1B-6B, wherein the one or more processors are further configured to signal or parse the first azimuth threshold in a bitstream.

Clause 8B. The device of any of clauses 1B-7B, wherein the first azimuth threshold comprises one of a non-negative number or a negative number.

Clause 9B. The device of any of clauses 1B-8B, wherein the first azimuth threshold comprises a non-negative number, wherein a second azimuth threshold comprises a negative number, wherein as part of determining that the second azimuth difference meets the first azimuth threshold, the one or more processors are configured to determine that the second azimuth difference is a) less than the first azimuth threshold or b) less than or equal to the first azimuth threshold, and wherein the one or more processors are configured to terminate the first prediction tree branch at the third point further based on a determination that the second azimuth difference is c) greater than or equal to second azimuth threshold or d) greater than the second azimuth threshold.

Clause 10B. The device of any of clauses 1B-9B, wherein as part of determining that the second azimuth difference meets the first azimuth threshold, the one or more processors are configured to determine that the second azimuth difference is a) less than or equal to the first azimuth threshold or b) less than the first azimuth threshold.

Clause 11B. The device of any of clauses 1B-9B, wherein as part of determining that the second azimuth difference meets the first azimuth threshold, the one or more processors are configured to determine that an absolute value of the second azimuth difference is a) greater than the first azimuth threshold or b) greater than or equal to the first azimuth threshold.

Clause 12B. The device of any of clauses 1B-11B, wherein the one or more processors are further configured to: determine a first scan row ID for the third point; determine a second scan row ID for the fourth point; and signal or parse one or more characteristics associated with at least one of the first scan row ID or the second scan row ID in a bitstream.

Clause 13B. The device of any of clauses 1B-12B, wherein as part of coding the point cloud data, the one or more processors are configured to encode the point cloud data.

Clause 14B. The device of any of clauses 1B-13B, wherein as part of coding the point cloud data, the one or more processors are configured to decode the point cloud data.

Clause 15B. The device of any of clauses 1B-14B, wherein the one or more processors are further configured to generate the point cloud.

Clause 16B. A method of coding point cloud data, the method comprising: determining a first point of the point cloud data to be a first node of a first prediction tree branch of a prediction tree; determining that a first azimuth difference between the first point and a second point of the point cloud data does not meet a first azimuth threshold, wherein the first point and the second point comprise successive points in an order; based on the first azimuth difference not meeting the first azimuth threshold, determining the second point to be a second node of the first prediction tree branch; determining that a second azimuth difference between a third point of the point cloud data and a fourth point of the point cloud data meets the first azimuth threshold, wherein the third point and the fourth point comprise successive points in the order and wherein the third point comprises a third node of the first prediction tree branch; based on the second azimuth difference meeting the first azimuth threshold, terminating the first prediction tree branch at the third point such that the third point comprises a leaf node of the first prediction tree branch and determine the fourth point to be a first node of a second prediction tree branch; connecting the first prediction tree branch and the second prediction tree branch in the prediction tree; and coding the point cloud data based on the prediction tree.

Clause 17B. The method of clause 16B, wherein connecting the first prediction tree branch and the second prediction tree branch comprises adding the first node of the second prediction tree branch as a child node of a first node of the first prediction tree branch.

Clause 18B. The method of clause 17B, wherein the first node of the first prediction tree branch is a root node of the prediction tree.

Clause 19B. The method of any of clauses 16B-18B, wherein connecting the first prediction tree branch and the second prediction tree branch comprises adding the first node of the second prediction tree branch as a child node of a node of the first prediction tree branch having a respective point of the point cloud data with a shortest distance to the fourth point from among all nodes of the first prediction tree branch.

Clause 20B. The method of any of clauses 16B-19B, wherein connecting the first prediction tree branch and the second prediction tree branch comprises adding the first node of the second prediction tree branch as a child node of a node of the first prediction tree branch having a respective point of the point cloud data having a shortest distance to the fourth point from among a predetermined number of nodes of the first prediction tree branch.

Clause 21B. The method of any of clauses 16B-20B, wherein the order comprises at least one of a sensor capture order or a coding order.

Clause 22B. The method of any of clauses 16B-21B, further comprising signaling or parsing the first azimuth threshold in a bitstream.

Clause 23B. The method of any of clauses 16B-22B, wherein the first azimuth threshold comprises one of a non-negative number or a negative number.

Clause 24B. The method of any of clauses 16B-23B, wherein the first azimuth threshold comprises a non-negative number, wherein a second azimuth threshold comprises a negative number, wherein determining that the second azimuth difference meets the first azimuth threshold comprises determining that the second azimuth difference is a) less than the first azimuth threshold or b) less than or equal to the first azimuth threshold, and wherein terminating the first prediction tree branch at the third point is further based on determining that the second azimuth difference is c) greater than or equal to second azimuth threshold or d) greater than the second azimuth threshold.

Clause 25B. The method of any of clauses 16B-24B, wherein determining that the second azimuth difference meets the first azimuth threshold comprises determining that the second azimuth difference is a) less than or equal to the first azimuth threshold or b) less than the first azimuth threshold.

Clause 26B. The method of any of clauses 16B-24B, wherein determining that the second azimuth difference meets the first azimuth threshold comprises determining that an absolute value of the second azimuth difference is a) greater than the first azimuth threshold or b) greater than or equal to the first azimuth threshold.

Clause 27B. The method of any of clauses 16B-26B, further comprising: determining a first scan row ID for the third point; determining a second scan row ID for the fourth point; and signaling or parsing one or more characteristics associated with at least one of the first scan row ID or the second scan row ID in a bitstream.

Clause 28B. The method of any of clauses 16B -27B, further comprising generating the point cloud.

Clause 29B. A device for coding point cloud data, the device comprising: means for determining a first point of the point cloud data to be a first node of a first prediction tree branch of a prediction tree; means for determining that a first azimuth difference between the first point and a second point of the point cloud data does not meet a first azimuth threshold, wherein the first point and the second point comprise successive points in an order; means for determining, based on the first azimuth difference not meeting the first azimuth threshold, the second point to be a second node of the first prediction tree branch; means for determining that a second azimuth difference between a third point of the point cloud data and a fourth point of the point cloud data meets the first azimuth threshold, wherein the third point and the fourth point comprise successive points in the order and wherein the third point comprises a third node of the first prediction tree branch; means for terminating, based on the second azimuth difference meeting the first azimuth threshold, the first prediction tree branch at the third point such that the third point comprises a leaf node of the first prediction tree branch and determine the fourth point to be a first node of a second prediction tree branch; means for connecting the first prediction tree branch and the second prediction tree branch in the prediction tree; and means for coding the point cloud data based on the prediction tree.

Clause 30B. Non-transitory, computer-readable storage media having stored thereon instructions that, when executed, cause one or more processors to: determine a first point of point cloud data to be a first node of a first prediction tree branch of a prediction tree; determine that a first azimuth difference between the first point and a second point of the point cloud data does not meet a first azimuth threshold, wherein the first point and the second point comprise successive points in an order; based on the first azimuth difference not meeting the first azimuth threshold, determine the second point to be a second node of the first prediction tree branch; determine that a second azimuth difference between a third point of the point cloud data and a fourth point of the point cloud data meets the first azimuth threshold, wherein the third point and the fourth point comprise successive points in the order and wherein the third point comprises a third node of the first prediction tree branch; based on the second azimuth difference meeting the first azimuth threshold, terminate the first prediction tree branch at the third point such that the third point comprises a leaf node of the first prediction tree branch and determine the fourth point to be a first node of a second prediction tree branch; connect the first prediction tree branch and the second prediction tree branch in the prediction tree; and code the point cloud data based on the prediction tree.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for coding point cloud data, the device comprising:
   one or more memories configured to store the point cloud data; and
   one or more processors implemented in circuitry and communicatively coupled to the one or more memories, the one or more processors being configured to:
      determine a first point of the point cloud data to be a first node of a first prediction tree branch of a prediction tree;
      determine that a first azimuth difference between the first point and a second point of the point cloud data does not meet a first azimuth threshold, wherein the first point and the second point comprise successive points in an order;
      based on the first azimuth difference not meeting the first azimuth threshold, determine the second point to be a second node of the first prediction tree branch;
      determine that a second azimuth difference between a third point of the point cloud data and a fourth point of the point cloud data meets the first azimuth threshold, wherein the third point and the fourth point comprise successive points in the order and wherein the third point comprises a third node of the first prediction tree branch;
      based on the second azimuth difference meeting the first azimuth threshold, terminate the first prediction tree branch at the third point such that the third point comprises a leaf node of the first prediction tree branch and determine the fourth point to be a first node of a second prediction tree branch;
      connect the first prediction tree branch and the second prediction tree branch in the prediction tree; and
      code the point cloud data based on the prediction tree.

2. The device of claim 1, wherein as part of connecting the first prediction tree branch and the second prediction tree branch, the one or more processors are configured to add the first node of the second prediction tree branch as a child node of a first node of the first prediction tree branch.

3. The device of claim 2, wherein the first node of the first prediction tree branch is a root node of the prediction tree.

4. The device of claim 1, wherein as part of connecting the first prediction tree branch and the second prediction tree branch, the one or more processors are configured to add the first node of the second prediction tree branch as a child node of a node of the first prediction tree branch having a respective point of the point cloud data with a shortest distance to the fourth point from among all nodes of the first prediction tree branch.

5. The device of claim 1, wherein as part of connecting the first prediction tree branch and the second prediction tree branch, the one or more processors are configured to add the first node of the second prediction tree branch as a child node of a node of the first prediction tree branch having a respective point of the point cloud data having a shortest distance to the fourth point from among a predetermined number of nodes of the first prediction tree branch.

6. The device of claim 1, wherein the order comprises at least one of a sensor capture order or a coding order.

7. The device of claim 1, wherein the one or more processors are further configured to signal or parse the first azimuth threshold in a bitstream.

8. The device of claim 1, wherein the first azimuth threshold comprises one of a non-negative number or a negative number.

9. The device of claim 1, wherein the first azimuth threshold comprises a non-negative number, wherein a second azimuth threshold comprises a negative number, wherein as part of determining that the second azimuth difference meets the first azimuth threshold, the one or more processors are configured to determine that the second azimuth difference is a) less than the first azimuth threshold or b) less than or equal to the first azimuth threshold, and wherein the one or more processors are configured to terminate the first prediction tree branch at the third point further based on a determination that the second azimuth difference is c) greater than or equal to second azimuth threshold or d) greater than the second azimuth threshold.

10. The device of claim 1, wherein as part of determining that the second azimuth difference meets the first azimuth threshold, the one or more processors are configured to determine that the second azimuth difference is a) less than or equal to the first azimuth threshold or b) less than the first azimuth threshold.

11. The device of claim 1, wherein as part of determining that the second azimuth difference meets the first azimuth threshold, the one or more processors are configured to determine that an absolute value of the second azimuth difference is a) greater than the first azimuth threshold or b) greater than or equal to the first azimuth threshold.

12. The device of claim 1, wherein the one or more processors are further configured to:
   determine a first scan row ID for the third point;
   determine a second scan row ID for the fourth point; and
   signal or parse one or more characteristics associated with at least one of the first scan row ID or the second scan row ID in a bitstream.

13. The device of claim 1, wherein as part of coding the point cloud data, the one or more processors are configured to encode the point cloud data.

14. The device of claim 1, wherein as part of coding the point cloud data, the one or more processors are configured to decode the point cloud data.

15. The device of claim 1, wherein the one or more processors are further configured to generate the point cloud.

16. A method of coding point cloud data, the method comprising:
   determining a first point of the point cloud data to be a first node of a first prediction tree branch of a prediction tree;

determining that a first azimuth difference between the first point and a second point of the point cloud data does not meet a first azimuth threshold, wherein the first point and the second point comprise successive points in an order;

based on the first azimuth difference not meeting the first azimuth threshold, determining the second point to be a second node of the first prediction tree branch;

determining that a second azimuth difference between a third point of the point cloud data and a fourth point of the point cloud data meets the first azimuth threshold, wherein the third point and the fourth point comprise successive points in the order and wherein the third point comprises a third node of the first prediction tree branch;

based on the second azimuth difference meeting the first azimuth threshold, terminating the first prediction tree branch at the third point such that the third point comprises a leaf node of the first prediction tree branch and determine the fourth point to be a first node of a second prediction tree branch;

connecting the first prediction tree branch and the second prediction tree branch in the prediction tree; and coding the point cloud data based on the prediction tree.

17. The method of claim 16, wherein connecting the first prediction tree branch and the second prediction tree branch comprises adding the first node of the second prediction tree branch as a child node of a first node of the first prediction tree branch.

18. The method of claim 17, wherein the first node of the first prediction tree branch is a root node of the prediction tree.

19. The method of claim 16, wherein connecting the first prediction tree branch and the second prediction tree branch comprises adding the first node of the second prediction tree branch as a child node of a node of the first prediction tree branch having a respective point of the point cloud data with a shortest distance to the fourth point from among all nodes of the first prediction tree branch.

20. The method of claim 16, wherein connecting the first prediction tree branch and the second prediction tree branch comprises adding the first node of the second prediction tree branch as a child node of a node of the first prediction tree branch having a respective point of the point cloud data having a shortest distance to the fourth point from among a predetermined number of nodes of the first prediction tree branch.

21. The method of claim 16, wherein the order comprises at least one of a sensor capture order or a coding order.

22. The method of claim 16, further comprising signaling or parsing the first azimuth threshold in a bitstream.

23. The method of claim 16, wherein the first azimuth threshold comprises one of a non-negative number or a negative number.

24. The method of claim 16, wherein the first azimuth threshold comprises a non-negative number, wherein a second azimuth threshold comprises a negative number, wherein determining that the second azimuth difference meets the first azimuth threshold comprises determining that the second azimuth difference is a) less than the first azimuth threshold or b) less than or equal to the first azimuth threshold, and wherein terminating the first prediction tree branch at the third point is further based on determining that the second azimuth difference is c) greater than or equal to second azimuth threshold or d) greater than the second azimuth threshold.

25. The method of claim 16, wherein determining that the second azimuth difference meets the first azimuth threshold comprises determining that the second azimuth is a) less than or equal to the first azimuth threshold or b) less than the first azimuth threshold.

26. The method of claim 16, wherein determining that the second azimuth difference meets the first azimuth threshold comprises determining that an absolute value of the second azimuth difference is a) greater than the first azimuth threshold or b) greater than or equal to the first azimuth threshold.

27. The method of claim 16, further comprising:
determining a first scan row ID for the third point;
determining a second scan row ID for the fourth point; and
signaling or parsing one or more characteristics associated with at least one of the first scan row ID or the second scan row ID in a bitstream.

28. The method of claim 16, further comprising generating the point cloud.

29. A device for coding point cloud data, the device comprising:
means for determining a first point of the point cloud data to be a first node of a first prediction tree branch of a prediction tree;
means for determining that a first azimuth difference between the first point and a second point of the point cloud data does not meet a first azimuth threshold, wherein the first point and the second point comprise successive points in an order;
means for determining, based on the first azimuth difference not meeting the first azimuth threshold, the second point to be a second node of the first prediction tree branch;
means for determining that a second azimuth difference between a third point of the point cloud data and a fourth point of the point cloud data meets the first azimuth threshold, wherein the third point and the fourth point comprise successive points in the order and wherein the third point comprises a third node of the first prediction tree branch;
means for terminating, based on the second azimuth difference meeting the first azimuth threshold, the first prediction tree branch at the third point such that the third point comprises a leaf node of the first prediction tree branch and determine the fourth point to be a first node of a second prediction tree branch;
means for connecting the first prediction tree branch and the second prediction tree branch in the prediction tree; and
means for coding the point cloud data based on the prediction tree.

30. A non-transitory, computer-readable storage media having stored thereon instructions that, when executed, cause one or more processors to: determine a first point of point cloud data to be a first node of a first prediction tree branch of a prediction tree;
determine that a first azimuth difference between the first point and a second point of the point cloud data does not meet a first azimuth threshold, wherein the first point and the second point comprise successive points in an order;
based on the first azimuth difference not meeting the first azimuth threshold, determine the second point to be a second node of the first prediction tree branch;
determine that a second azimuth difference between a third point of the point cloud data and a fourth point of the point cloud data meets the first azimuth threshold, wherein the third point and the fourth point comprise successive points in the order and wherein the third point comprises a third node of the first prediction tree branch;

based on the second azimuth difference meeting the first azimuth threshold, terminate the first prediction tree branch at the third point such that the third point comprises a leaf node of the first prediction tree branch and determine the fourth point to be a first node of a second prediction tree branch;

connect the first prediction tree branch and the second prediction tree branch in the prediction tree; and code the point cloud data based on the prediction tree.

* * * * *